(12) United States Patent
Crussol et al.

(10) Patent No.: US 8,260,683 B2
(45) Date of Patent: Sep. 4, 2012

(54) METHOD AND SYSTEM FOR EXECUTING ELECTRONIC COMMERCE TRANSACTIONS

(75) Inventors: Sebastien Crussol, Nevers (FR); Philippe Mendil, Saint Hymer (FR)

(73) Assignee: Cards Off S.A., Paris (FR)

( * ) Notice: Subject to any disclaimer, the term of this patent is extended or adjusted under 35 U.S.C. 154(b) by 1395 days.

(21) Appl. No.: 11/837,262

(22) Filed: Aug. 10, 2007

(65) Prior Publication Data
US 2008/0040237 A1 Feb. 14, 2008

(30) Foreign Application Priority Data

Aug. 10, 2006 (EP) .................................. 06300875

(51) Int. Cl.
*G06Q 30/00* (2006.01)
(52) U.S. Cl. ..................................... 705/26.42
(58) Field of Classification Search ................ 705/26.1, 705/27.1, 26.42
See application file for complete search history.

(56) References Cited

U.S. PATENT DOCUMENTS

| | | | | |
|---|---|---|---|---|
| 6,085,168 | A * | 7/2000 | Mori et al. ...................... | 705/17 |
| 7,996,288 | B1 * | 8/2011 | Stolfo ............................. | 705/35 |
| 2004/0093277 | A1 * | 5/2004 | Faerch et al. ................... | 705/26 |

FOREIGN PATENT DOCUMENTS
WO 02/05231 A3 1/2002

OTHER PUBLICATIONS

Anonymous, "Oracle Commercializes Security Developed for U.S. Intelligence Agency," PR Newswire, Feb. 28, 2001, p. 1.*

* cited by examiner

*Primary Examiner* — Jeffrey A Smith
*Assistant Examiner* — Brandy A Zukanovich
(74) *Attorney, Agent, or Firm* — Osha Liang LLP

(57) ABSTRACT

A method for completing an electronic commerce transaction, involving receiving security information associated with a real identity of a buyer, receiving virtual security labels corresponding to security information associated with the real identity of a buyer, storing the security information and the virtual security labels in an isolated entity of a dedicated payment system, transferring the virtual security labels to a virtual world entity of the dedicated payment system, wherein the virtual world entity is operatively connected to a first network using which the buyer connects to the dedicated payment system, and executing the electronic commerce transaction via the first network using the virtual security labels and the security information associated with the real identity of the buyer, wherein the isolated entity is communicatively disjoined from the virtual world entity and the first network, and wherein security information associated with the real identity of the buyer is not transmitted via the first network during execution of the electronic commerce transaction.

19 Claims, 17 Drawing Sheets

METHOD AND SYSTEM FOR EXECUTING ELECTRONIC COMMERCE TRANSACTIONS

CROSS REFERENCE TO RELATED APPLICATIONS

This application claims benefit of European Application No. 06300875.9, entitled "Electronic Commerce Transaction Process," filed Aug. 10, 2006, in the name of Sebastien Crussol and Philippe Mendil.

BACKGROUND

In existing on-line electronic transaction systems, an on-line vendor site processes a payment from a buyer dealing directly with another entity that is involved in the transaction. Generally, the other entity is a financial institution that accepts credit card payments, prepaid cards, prepaid accounts, bank wirings, tokens, and/or other forms of payment. Thus, one of the on-line vendor site or the financial institution require to obtain confidential data from the buyer such as personal identity, personal name, personal address, postal address, credit card data, bank account information and/or other financial data. The buyer, the on-line vendor site, and the other entity communicate over a same network, typically the internet.

Although various measures may be implemented to secure the transmission of the confidential information, e.g., encryption of transmission, use of firewalls to protect payment servers storing the confidential information, etc., it appears that the confidential information is never really safe from being stolen by thieves operating over the same network as the on-line vendor site, the buyer and/or the other entity. Moreover, the rising number of on-line vendor sites requires the confidential information to be dispatched an/or stored as many times as there as vendor sites used by the buyer. The number of security breaches occurring on the vendor sites or during transmission has been increasing recently, thereby causing increasing misuse of confidential data, and substantial financial damages to buyers and institutions that guarantee the payment of on-line transactions, such as credit card and insurance companies.

In an effort to improve security in payment processing it is known to involve a third party for the payment processing. The International application published under WO 02/05231A2 discloses such a system wherein a buyer uses the internet to make an on-line selection of items on a seller's web site, and is redirected over the internet to a third party payment processor to process payment for an electronic transaction. During exchanges with the payment processor, the buyer may be electrically disconnected from the seller, thereby preventing financial or private data from being passed to the seller. The third party establishes an account for the buyer, if one does not already exist which may be funded by a credit card, debit card or bank account. The account is identified with an electronic mail address or other unique identifier. The payment processor transfers payment from the buyer to the seller. Eventually, the buyer may be redirected to the seller after completion or cancellation of payment. In the system of WO 02/05231A2, the buyer's financial information is transmitted over the internet connection between the buyer and the payment processor at the time of requesting payment, or retrieved from a storage of the payment processor if the buyer had previously transmitted his/her financial information in view of upcoming transactions. On the whole, at least at some point in time, the buyer needs to transmit financial or private data over the internet. In case a thief gets hold of buyer's account identification, the thief may at least use the account to pay for items bought on the seller's site.

Thus, the technical problem to be solved involves the execution of an electronic commerce transaction without sensitive and/or personal information being transmitted via an unsecured network, such as the Internet at any time. Further, such sensitive/personal information also should not be stored at a known location that is accessible via an unsecure network connection.

SUMMARY

In general, in one aspect, the invention relates to a method for completing an electronic commerce transaction, comprising receiving security information associated with a real identity of a buyer, receiving virtual security labels corresponding to security information associated with the real identity of a buyer, storing the security information and the virtual security labels in an isolated entity of a dedicated payment system, transferring the virtual security labels to a virtual world entity of the dedicated payment system, wherein the virtual world entity is operatively connected to a first network using which the buyer connects to the dedicated payment system, and executing the electronic commerce transaction via the first network using the virtual security labels and the security information associated with the real identity of the buyer, wherein the isolated entity is communicatively disjoined from the virtual world entity and the first network, and wherein security information associated with the real identity of the buyer is not transmitted via the first network during execution of the electronic commerce transaction.

In general, in one aspect, the invention relates to a system for completing an electronic commerce transaction, comprising a first computing device configured to connect a buyer associated with the electronic commerce transaction to an online vendor site, the online vendor site (OVS) executing on a second computing device and configured to provide an electronic commerce service to the buyer, and a dedicated payment system configured to facilitate a payment from the buyer to the OVS for the electronic commerce service, comprising a virtual world entity configured to connect a buyer associated with an electronic commerce transaction to the dedicated payment system via a first network and to store virtual security labels associated with the buyer in a repository, an isolated entity configured to receive and store security information associated with the real identity of the buyer, and a transporting agent configured to transmit data associated with the electronic commerce transaction between the virtual world entity and the isolated entity, wherein the transporting agent is connected to only one of the virtual world entity and the isolated entity at a time, and wherein the security information associated with the real identity of the buyer is not transmitted over the first network.

In general, in one aspect, the invention relates to a method for completing an electronic commerce transaction, comprising supplying, by a buyer, security information associated with a real identity of the buyer, supplying virtual security labels corresponding to the security information associated with a real identity of the buyer, wherein the virtual security labels exclude information associated with the real identity of the buyer, requesting an electronic commerce service from an online vendor site accessed via a first network, wherein the electronic commerce service comprises the purchase of an object, and executing the electronic commerce transaction on the online vendor site, wherein executing the electronic commerce transaction comprises providing the online vendor site with virtual security labels, and receiving delivery of the purchased object, wherein security information associated with the real identity of the buyer is not transmitted over the first network while executing the electronic commerce transaction; and wherein a payment associated with the purchased object is completed over a proprietary network configured to facilitate communication between a dedicated payment system and a bank account associated with the online vendor site.

Other aspects of the invention will be apparent from the following description and the appended claims.

DETAILED DESCRIPTION

Figure 1:
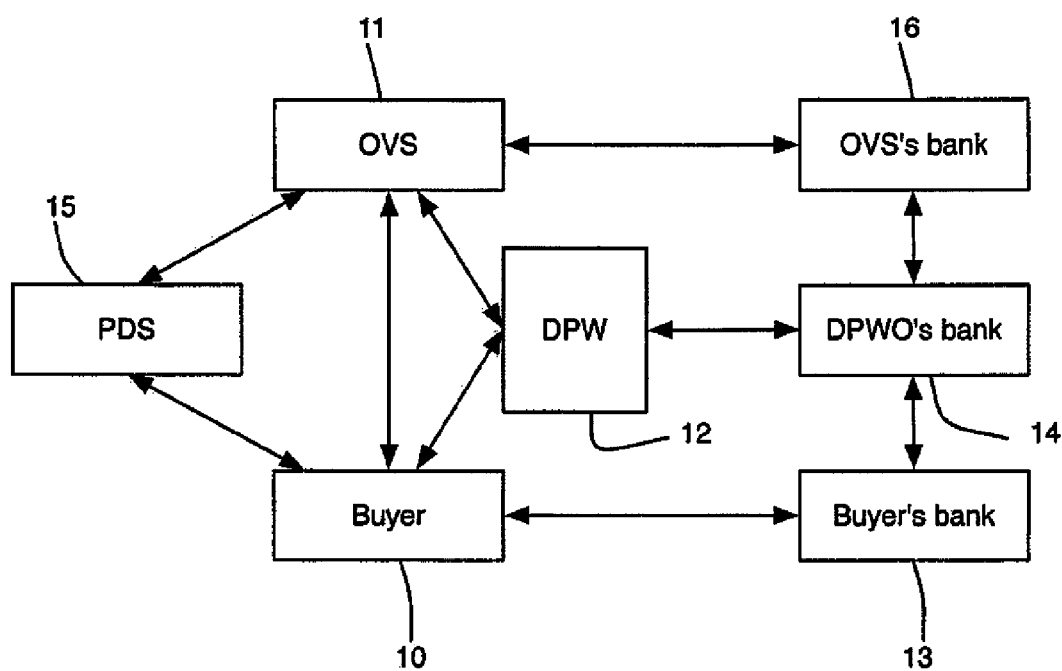
FIG. 1 shows a system overview of an example transaction according to one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for executing an electronic commerce transaction. More specifically, the present invention allows to place a buying and delivery order over the internet for a product or service while achieving a payment of the placed order without ever disclosing any real and/or confidential information, e.g., the real identity of the buyer, the address of the buyer, the banking information of the buyer or the credit card information of the buyer over the internet. Hence the present invention provides an unprecedented level of security for electronic commerce transaction over the internet. In short, the invention effectively achieves this through a specific registration procedure to register the buyer and through a creation of a number of labels and virtual parameters corresponding to real and/or confidential information of the buyer. The labels and virtual parameters may be used in a virtual world entity of a dedicated payment system according to the invention, to process an electronic commerce transaction order. The labels and virtual parameters may be used instead of the real identity of the buyer, the address of the buyer, the banking information of the buyer. The labels and virtual parameters comprise at least one item corresponding to a security parameter that needs to be fulfilled during a making of the electronic commerce transaction. This will be understood better and in more detail in view of the following description of examples of preferred embodiments.

Referring to FIG. 1, a schematic overview of actors involved in an example of a typical electronic commerce transaction is shown. The electronic commerce transaction involves the purchase of one or more objects. In one or more embodiments of the invention, the purchase of an object may involve a purchase of material items, e.g., physical goods, over an unsecured network, such as the Internet, a mobile telephone network, a television-cable network, a public switched telephone network (PSTN), or any other type of public network. In this case, the physical goods purchased may need to be delivered physically to the buyer after the purchase is completed. Alternatively, the electronic commerce transaction may involve the purchase of objects that are non-material in nature and may not require the same type of physical delivery to the buyer. For example, in one or more embodiments of the invention, the electronic commerce transaction may involve the purchase or payment of a service, such as online software purchasing, downloading and paying for music content online paying a fine associated with a ticket, purchasing an airline ticket online, or any other electronic service in which a buyer may engage or make a payment for.

In order to initiate a typical transaction, a buyer 10 connects to an on-line vendor site (OVS) 11 in a conventional manner, e.g., using a web browser client (not shown in FIG. 1) or any other transactional program executing on the computing device. Those skilled in the art will appreciate that the buyer may connect to an OVS using any computing device that supports a network connection, such as a personal computer, a mobile phone, a cable network device, a personal digital assistant, a gaming device, etc. The buyer 10 then selects one or more items (not shown in FIG. 1) to buy. The items may typically be gathered in an electronic shopping cart (not shown in FIG. 1). Further, the OVS may also be running on another computing device, as described above. For example, the OVS may be associated with a particular online vendor that operates its website on a server, a personal computer, or any other computing device.

Those skilled the art will appreciate that the OVS 11 may be the vendor's web site itself, but the expression OVS may also be used to designate an actual operator of the site when, for example, it comes to receiving and/or implementing instructions for delivery.

Once the buyer 10 has finished making a selection of items, he/she needs to confirm his/her selection and proceed to payment of an agreed price for the items. The buyer 10 proceeds to payment by pushing a payment button (not shown in FIG. 1) that appears on the web page that he/she is viewing. By pushing the payment button the buyer is redirected to a dedicated payment website (DPW) 12 that is owned by a dedicated payment website operator. The dedicated payment website 12 and the dedicated payment website operator are represented by the single entity 12 in FIG. 1.

During redirection to the DPW 12, the OVS may identify itself on the DPW. Once identification of the OVS 11 is successful, the OVS transfers transaction information including, for example, a reference for the electronic commerce transaction that would result from the buyer's selection of items, and an agreed purchase price for the item(s) purchased.

The buyer 10 authenticates himself/herself on the DPW 12 via the web browser executing on the buyer's computing device. This may be done, for example, by entering a login identification and a corresponding password (not shown in FIG. 1). Following authentication, the DPW 12 may offer the buyer 10 a selection of one or a plurality of predetermined delivery addresses. The one or plurality of predetermined delivery addresses do not appear as actual real addresses, but rather are represented each by a corresponding virtual address parameter. The virtual address parameter may be, for example, a generic term such as "home" or "office". As will be understood in the course of the description, the predetermined delivery address constitutes the security parameter that needs to be fulfilled during the execution of the electronic commerce transaction. In addition to confirming his/her selection of a virtual address parameter, the buyer may further confirm the agreed price (not shown in FIG. 1). Those skilled in the art will appreciate that the security parameter fulfilled during the electronic commerce transaction may be any unique identifier of the buyer, and not necessary the buyer's delivery address. For example, if the electronic commerce transaction involves paying a fine associated with a parking ticket, then the security parameter fulfilled during the electronic commerce transaction may involve the buyer supplying the buyer's car license plate number, and the virtual security parameter may involve a virtual label associated with the buyer's car license plate number, so that the actual license plate number is not transmitted over the first network. In other embodiments of the invention, the security parameter may include the buyer's social security number, the buyer's drivers' license number, or any other unique identifier/personal information secured by the buyer.

Those skilled in the art will appreciate that the predetermined delivery address, i.e., the real address or postal address of the buyer, was transmitted to the dedicated payment site operator prior to initiating the electronic commerce transaction, preferably during the time that the buyer subscribed to the services offered by the DPW. Similarly, prior to the electronic commerce transaction, the buyer also transmitted to the dedicated payment site operator his real identity and bank information. Information associated with the buyer's real identifier may include, but it not limited to, the buyer's social security number, the buyer's telephone numbers, the buyer's car license plate number, the buyer's drivers' license number, the buyer's email address, or any other unique identifier of the buyer. The transmission of personal information such as real identity, bank information and predetermined delivery address from the buyer to the dedicated payment website operator is part of a preliminary subscription that needs to be made off-line for security reasons. More specifically, such sensitive information is transmitted over a secure, proprietary network, rather than the network that the virtual world entity is connected to. At no time should any sensitive personal information concerning the buyer be transited on-line, as information transmitted on-line may potentially be intercepted and re-used by a third party, e.g., by a thief or a hacker.

The DPW 12 then proceeds to inform the OVS 11 that the order for the selected items is confirmed. At this point, the OVS 11 may obtain from the DPW 12 the predetermined delivery address corresponding to the selected virtual address parameter in order for the OVS 11 to prepare for the delivery. However, the actual delivery of the selected items is not executed until the dedicated payment site confirms delivery instructions and after a first wire transfer securing payment for the purchase price of the object purchased from the buyer's bank account to a system operator's bank account is executed.

At this point of the process, the buyer 10 has completed his order. The DPW Operator 12 (DPWO) proceeds to initialise a payment of the agreed price using the buyer's bank information. As already mentioned, the buyer's bank information was given to the DPWO 12 by the buyer prior to the electronic commerce transaction. The initialization of the payment may for example be done by giving instructions to a DPWO's bank 14 to debit the agreed price from the buyer's bank account at buyer's bank 13 to the benefit of the DPWO. Said another way, a wire transfer over a proprietary bank network is performed to secure payment from the buyer's bank account to a system operator's bank account. The system operator bank account may be any neutral bank account agreed to by the buyer, the OVS, and the banks involved to hold the payment for the purchase price of the object until delivery of the object to the buyer is successful. Once confirmation over the debit of the agreed price is obtained, for example from DPWO's bank 14, the DPWO 12 contacts the OVS 11 to request that the delivery instructions are executed. Thus, the DPW initiates a delivery order to the OVS after the initial wire transfer is performed and payment is secured in a neutral bank account.

The OVS 11 now proceeds to confirm the delivery of the selected items that were bought. This is done using a preferred delivery service (PDS) 15. Upon delivery of the selected items at the buyer's predetermined address, a confirmation of delivery (not shown in FIG. 1) is obtained by the PDS from the buyer, and forwarded to the OVS 11. The OVS 11 returns the confirmation of delivery to the DPWO 12. This triggers payment of the OVS 11 by the DPWO 12. The payment may for example be done using the DPWO's bank 14 and an OVS's bank 16. Here, in one or more embodiments of the invention, a second wire transfer is performed to secure payment from the system operator's bank account to the online vendor bank account. Again, the second wire transfer is performed over a proprietary bank network, and not via the first network. The execution of the second wire transfer results in the payment for the purchase price of the object to be received by the online vendor in a bank account associated with the online vendor. The banking information (i.e., bank account numbers, routing information associated with the bank account(s), etc.) for the online vendor's bank account(s) is also supplied to the back office (i.e., the isolated entity) by the online vendor prior to the commencement of the electronic commerce transaction.

Those skilled in the art will appreciate that in the present example, the selected items are of material nature and hence need to be delivered using a delivery service such as a courier company. In one or more embodiments of the invention, the selected items may be of immaterial nature. In the latter case, the delivery of the selected items may be performed in another manner, for example, through a downloading service, in the case where the selected items are software.

The OVS 11 is responsible for facilitating the successful delivery of the selected items and providing a confirmation of delivery to the DPWO. If the OVS 11 fails to successfully deliver the selected items, the OVS 11 may not be paid by the DPWO. Hence the OVS 11 must take particular care in organizing the delivery and obtaining the confirmation of delivery for the selected items. If the buyer claims that the selected items were not delivered properly, despite the fact that the OVS is in possession of the confirmation of delivery, the OVS 11 may have to prove that a proper delivery was made to the buyer at the selected predetermined address.

The DPWO 12 then informs the OVS 11 about the payment and may archive all information related to the completed transaction. At this point the typical transaction may be considered complete.

The present overview of a typical transaction, i.e., an example embodiment of the invention, provides a simplified explanation of the inventive process and system that will help to understand the following more detailed presentation of technical features and process steps.

Figure 2:
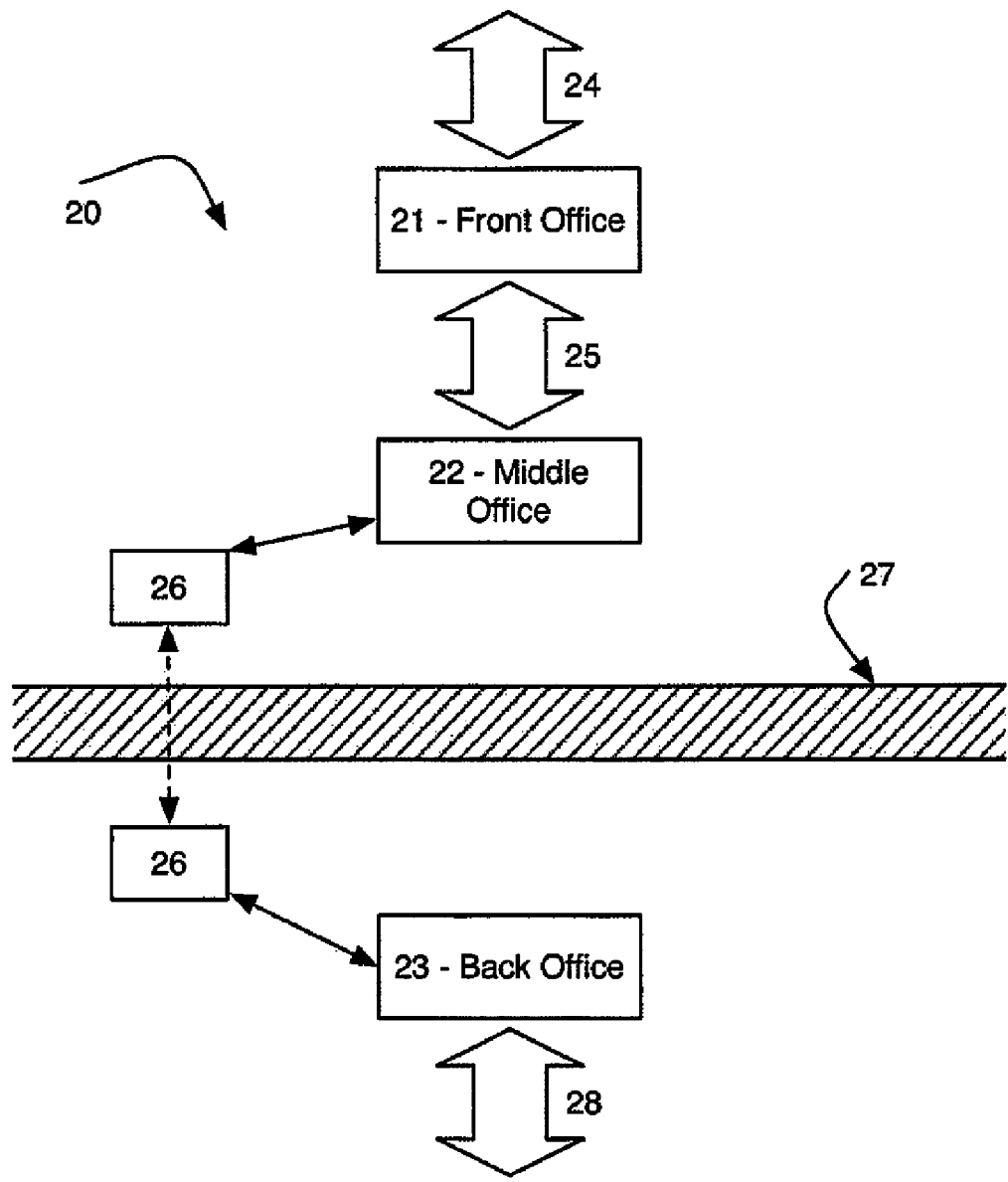
FIG. 2 shows a schematic overview of an example dedicated payment system according to one or more embodiments of the invention.

FIG. 2 contains a schematic representation of an example dedicated payment system 20 according to the invention. The dedicated payment system 20 is operated by the dedicated payment website operator (not shown in FIG. 2). More specifically, in one or more embodiments of the invention, the dedicated payment system 20 may comprise a front office 21, a middle office 22 and a back office 23.

The front office 21 may handle network communication 24 between the dedicated payment system and the buyer (not shown in FIG. 2) or the on-line vendor site (not shown in FIG. 2). The network communication 24 is represented by a first double arrow 24. The network communication 24 may occur over a first network (not shown in FIG. 2), e.g., the Internet, in which the front office is seen as having a determined IP address. If the first network is the Internet, the network communication 24 may be based on the well-known TCP/IP standard. The network communication may comprise a secured link such as the known Virtual Private Network link (VPN) (not shown in FIG. 2). The VPN may be used to exchange transaction information with the on-line vendor site in case some additional security is desired. Although the VPN uses the network communication 24, it has a VPN-IP address distinct from the front office's determined IP address.

The front office 21 further handles exchanges 25 with the middle office 22 as represented by a second double arrow 25. The exchanges 25 may typically be of the same TCP/IP standard as used for the network communication 24.

The middle office 22 may host an application that is made available through the front office 21 to the network communication 24. The application may process or generate application data (not shown in FIG. 2). Application data to be processed by the middle office 22 may be provided from either the front office 21 or the back office 23. The other way around, application data may be generated by the middle office 22 and directed to either the front office 21 or the back Office 23.

Application data generated by the middle office 22, and intended to the front office 21 transits through the exchanges 25. Application data generated by the middle office 22, and intended to the back office 23 first transits to an Alternating Switch Data Transporting Device 26 (ASDTD). The ASDTD 26 may be understood as a storage medium that may either be operatively connected to the middle office 22 or to the back office 23, but not to both the middle office 22 and the back office simultaneously. In one or more embodiments of the invention, the ASDTD 26 may be implemented as an application (i.e., a software transporting agent) or as a physical device.

In an example case where the ASDTD 26 is a physical device, in order to transfer application data generated by the middle office 22 to the back office 23, the ASDTD 26 is connected to the middle office 22 through first connecting means as represented by a double arrow between the ASDTD 26 and the middle office 22, and the application data is then stored by the middle office 22 on the ASDTD 26. The ASDTD 26 is then disconnected from the middle office 22 and connected to the back office 23 through second connecting means as represented by a double arrow between the ASDTD 26 and the back office 23. The back office 23 then reads the data from the ASDTD 26.

In another example, the ASDTD 26 is implemented as a software application, and has a functioning similar to the functioning of the physical device. An additional security may be brought to the ASDTD implemented as an application, by introducing restriction on a type of information and/or on a format of information that the ASDTD is enabled to store and to move from the middle office 22 to the back office 23 or vice-versa. This way no other type or format of information other than specified in the restriction may be moved by the ASDTD (discussed below in FIG. 4B).

As represented in FIG. 2 by a hashed bar 27, the middle office 22 and the back office 23 are physically disconnected, or in other words communicatively disjoined. The absence of a physical connection between the middle office 22 and the back office 23 makes it impossible to communicate any electrical signal between these entities. The absence of the physical connection therefore assures that any network connection over a network link, e.g., a link of physical, electronic, magnetic, optical or electromagnetic nature is prohibited. The only possible way to provide any data from the middle office 22 to the back office 23 is to use the ASDTD 26 that may be switched between these entities in an alternating manner. The switching of the ASDTD 26 between these entities is represented by a hashed double arrow that crosses the hashed bar 27.

In a further example of a physical device, the ASDTD may be a storage robot with storage means (not shown in FIG. 2). The storage robot may comprise transporting means that transport the storage means between the middle office 22 and the back office 23.

Similarly, application data provided from the back office 23, which is intended to be processed by the middle office 22 first transits to the ASDTD 26. The ASDTD 26 is switched to the back office 23 and the application data is stored by the back office 23 on the ASDTD 26. The ASDTD 26 is subsequently "disconnected" from the back office 23 and switched to the middle office 22. The middle office 22 then reads the data from the ASDTD 26.

The back office 23 further handles bank exchanges 28 as represented by a double arrow 28. The bank exchanges 28 comprise information exchanges with the dedicated payment website operator's bank (not shown in FIG. 2). The bank exchanges 28 may transit over a proprietary network (not shown) that is distinct from a network used for the network communications 24, e.g., a proprietary network distinct from the first network, or distinct from the Internet if appropriate. The distinct nature of the networks guarantees that there is no possibility to access information communicated on the proprietary network by means of the network used for the network communications 24. The distinct nature of the networks hence contributes to improve the overall security of the dedicated payment system 20.

Separate entities and items of the dedicated payment system 20 will now be described in more detail.

Figure 3:
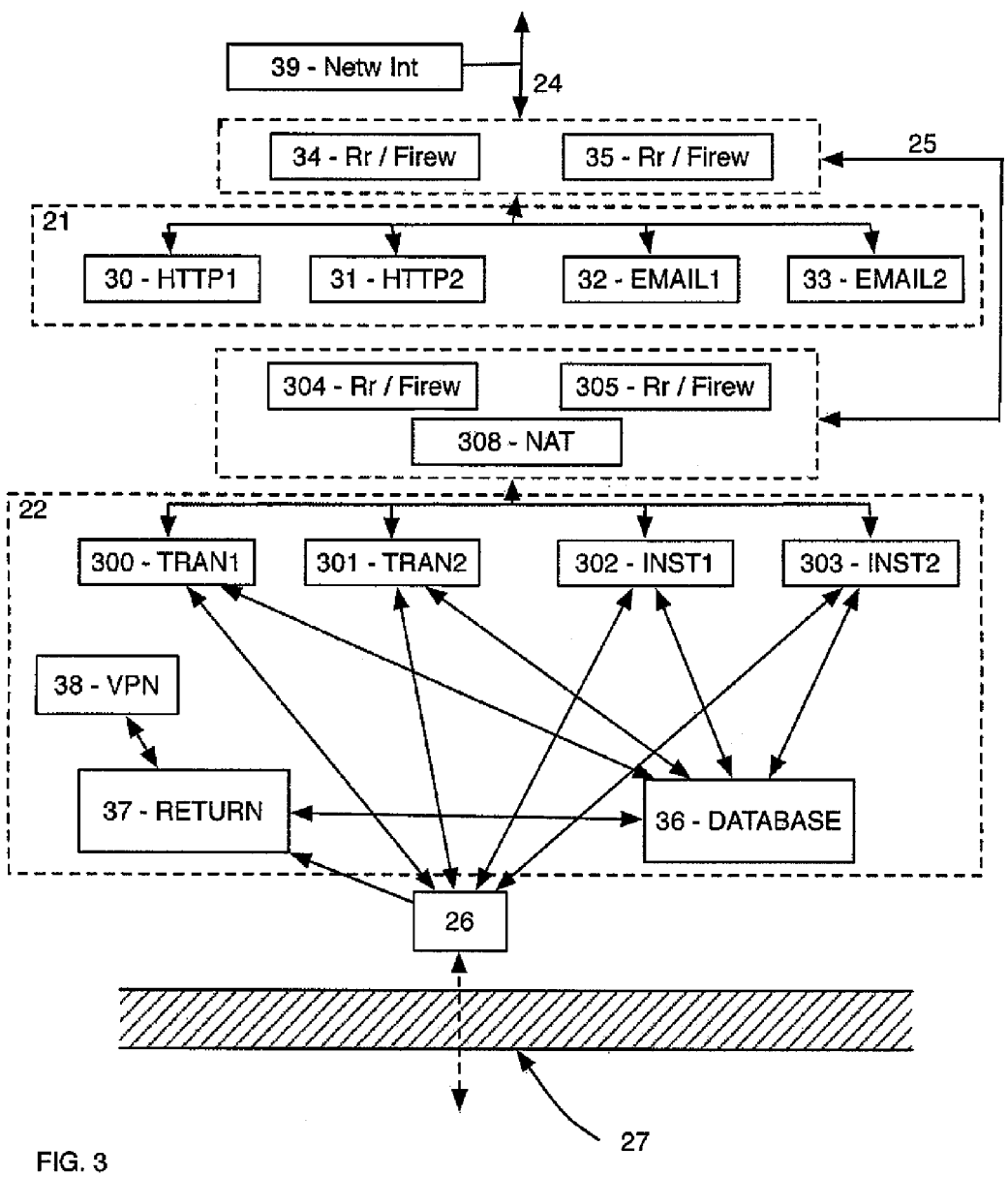
FIG. 3 shows a schematic overview of an example front office and middle office in a dedicated payment system according to one or more embodiments of the invention.

The front office and middle office may together be defined as a first entity or virtual world entity that is connected to the first network (e.g., the Internet) but disconnected from the proprietary network. FIG. 3 shows an example embodiment for realising the front office 21 and middle office 22.

The front office 21 may, for example, include a plurality of servers, including web servers 30 and 31, and email communication servers 32 and 33. The front office 21 handles network communication 24 with the first network (not shown in FIG. 3) through one or a plurality of routers and firewalls 34 and 35. A network interface 39 allows to interface between the set of routers and firewalls 34 and 35, and the first network to enable the network communications 24. The network interface 39 may for example be provided or specified by an Internet Service Provider (ISP) to access the internet, and would as such only be relevant in a configuration where the firsts network is internet, to provide access to the internet. Other types of network interfaces 39 may be used depending on the nature of the first network.

A Network Allocation Table (not shown) of the front office 21 may be used to attribute private network addresses to the servers 30-33, and allows the latter servers 30-33 to communicate with the middle office 22 through a single fixed front office IP address that may be attributed to a router of the front office 21. Similarly, a second fixed front office IP address may be implemented to communicate with vendors through the first network.

The middle office 22 may, for example, include a plurality of servers, including transaction servers 300 and 301, and internal processing servers 302 and 303. The transaction servers 300 and 301 are used to process any electronic commerce transaction orders received from the first network through the front office 21 and to prepare determined application data intended for the back office (not shown in FIG. 3). The transaction servers 300 and 301 may also be referenced as an order processing server. The internal processing servers 302 and 303 are used to process any data specific to the operator of the dedicated payment system. This includes identification of buyers connecting to the dedicated payment system as subscribed buyers. As such the internal processing servers 302 and 303 implement a buyer identification module.

The middle office 22 runs a global application that is deployed over the various servers 300-303 of the middle office 22, where each server 300-303 has specific capabilities and tasks in the middle office 22.

The servers 300-303 in addition implement a mail server (mail server not explicitly shown in FIG. 3) that may be used to format electronic mails at the middle office level before such electronic mails are transmitted to the email servers 32 and 33, or handle electronic mails after they are received from the email servers 32 33 of the front office 21.

The set of transaction servers 300 and 301, and internal processing servers 302 and 303 handles data exchanges 25, represented by a double arrow in FIG. 3, with the front office 21 through one or a plurality of routers and firewalls 304 and 305 and the set of routers and firewalls 34 and 35. A Network Allocation Table 308 may be used to attribute private network addresses to the transaction servers 300 and 301 and the internal processing servers 302 and 303, and allows the latter servers 300-303 to communicate with the front office 21 through a single middle office fixed IP address that may be attributed to a router of the middle office 22.

Each transaction server 300 and 301, and internal processing server 302 and 303 may have access to a database 36. The database 36 may for example contain tables of login identifications and passwords used to identify subscribed buyers (not shown in FIG. 3) who wish to connect to the dedicated payment system. The database may further contain virtual banking labels and virtual security parameter labels. The database 36 may only contain data that does not link to any information associated with the real identity of the buyer. In other words, all data contained in the database 36 must be deprived of any information that would indicate real life data of a subscribed buyer, such as for example the buyer's name, any type of real address of the buyer, or the buyer's banking information. Therefore, the data contained in the database 36 may only contain labels and virtual parameters attributed to the subscribed buyer, who is only known in the database 36 through his login identification. The login identification in turn should not be representative of the buyer's real name. The login identification is merely a virtual identity of the buyer. As such, the database 36 may also be referenced as a virtual world database. Further, the virtual world database includes virtual labels corresponding to each type of security information of the buyer, such as the buyer's email address, the buyer's telephone number, the buyer's social security number, the buyer's car license plate number, the buyer's drivers' license number, etc.

The middle office 22 further comprises an outgoing communication server 37 that may for example be used to return a confirmation of an order for an electronic commerce transaction and/or instruct delivery of an ordered item to an on-line vendor site (not shown in FIG. 3). The outgoing communication server 37 makes use of a secured Virtual Private Network (VPN) 38 as an interface to the on-line vendor site.

Finally any application data that is generated by the middle office 22 for the back office (not shown in FIG. 3) or any application data that was generated by the back office for the middle office 22, is stored on the ASDTD 26, which may be switched from the middle office 22 to the back office 23 and vice-versa. Similar as in FIG. 2, the physical separation between the middle office 22 and the back office 23 is represented by the hashed bar 27.

Information may be provided directly from the ASDTD 26 to the outgoing communication server 37 for processing of this information before transmittal through the VPN 38.

The back office 23 may be defined as a second entity or isolated entity that is disconnected from the first network but optionally connected to the proprietary network for bank exchanges as discussed in relation to FIG. 2.

Figure 4A:
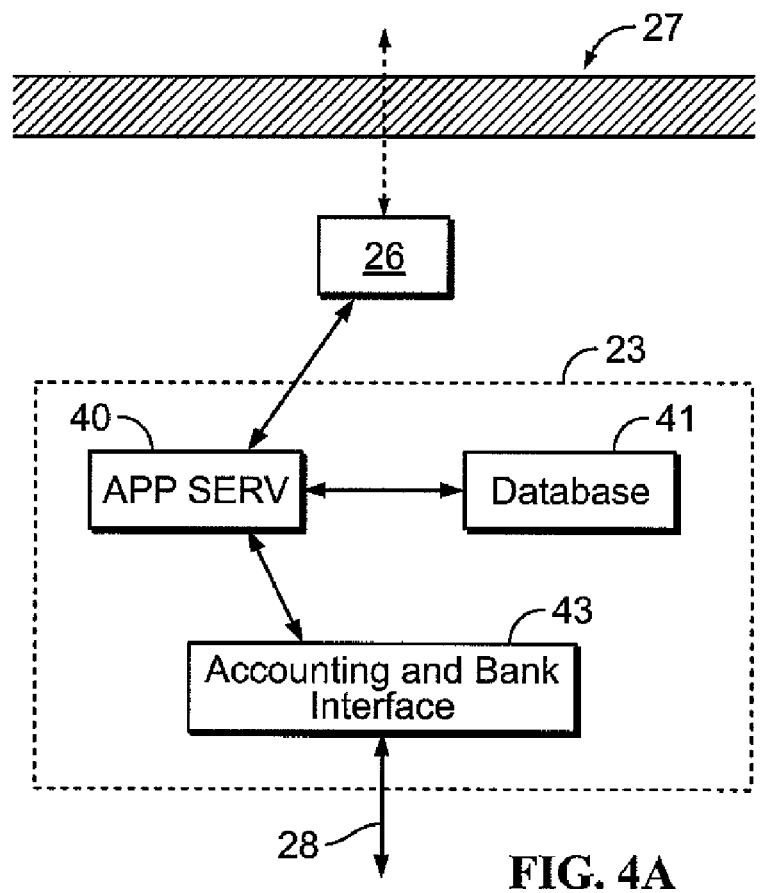
FIG. 4A shows a schematic overview of an example back office in a dedicated payment system according to one or more embodiments of the invention.

FIG. 4A shows an example embodiment for realizing the back office 23. Similar as in FIG. 2, the physical separation between the middle office 22 (not shown in FIG. 4A) and the back office 23 is represented by the hashed bar 27.

The ASDTD 26 may provide application data generated by the middle office 22 to an application server cluster 40. The application server cluster 40 may comprise a plurality of dedicated servers that have not been represented individually in FIG. 4A for reasons of better readability. Such dedicated servers may for example be a communication server, an internal administration server or a transaction server.

The application server cluster 40 has access to a confidential database 41. The confidential database 41 may for example include tables (or other data structures) that store mappings of information associated with the real identities of buyers corresponding to the virtual security labels of the buyers (i.e., login identifications of subscribed buyers, virtual security parameter, etc.). Real identities may be information used in real life such as first and last name, date of birth, etc. The confidential database 41 may further include information such as security parameters, e.g., delivery addresses of buyers, and banking information related to the subscribed buyers. Security parameters may comprise a postal address at which the subscribed buyer may be reached by post. Security parameters may further comprise one or more addresses to select at which the subscribed buyers may wish an ordered item to be delivered. Banking information may include a banking account of the subscribed buyer including all data necessary to prepare instructions to a bank in order to transfer the money for an agreed price from subscribed buyer's account to a predetermined account.

The confidential database 41 further contains login identification, virtual banking labels and virtual security parameter labels that have been attributed respectively to the real identity, the banking information and the security parameters of the subscribed buyer. Hence the confidential database may be used to re-establish the real identity of a login identification, the banking information for a virtual banking label and the security parameter for a virtual security parameter label.

The application server cluster 40 may eventually prepare instructions intended to a bank in order to transfer money from a subscriber buyer to a predetermined bank account as a result of processing an order for an electronic commerce transaction. Such instructions intended to the bank are handled in an accounting server and bank interface 43 before being transferred by means of bank exchanges 28 through a proprietary network (not shown in FIG. 4A). Those skilled in the art will appreciate that the back office 23 does not, at any time, establish a connection to the first network (not shown in FIG. 4A) for obvious reasons of security.

Figure 4B:
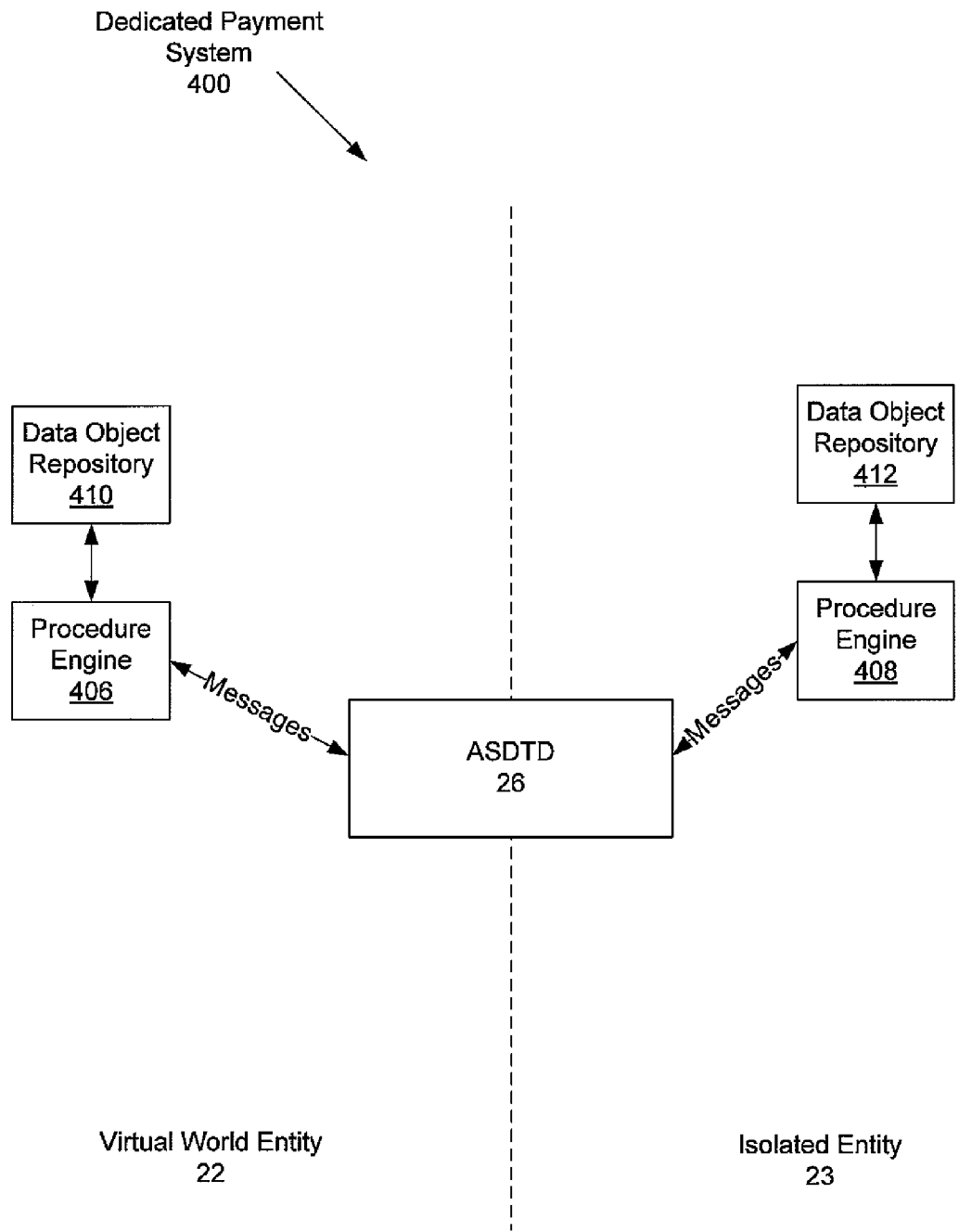
FIG. 4B shows an expanded view of the dedicated payment system in accordance with one or more embodiments of the invention.

FIG. 4B shows an expanded view of the virtual world entity and the isolated entity in accordance with one or more embodiments of the invention. Particularly, FIG. 4B discusses components specific to the dedicated payment system (400) that facilitate the transmission of data between the virtual world entity (22) and the isolated entity (23) via the transporting agent (26) (i.e., the ASDTD). In addition to the components of the middle office (virtual world entity) and the back office (isolated entity) described in FIGS. 3 and 4, FIG. 4B shows that the virtual world entity (22) and the isolated entity (23) include a procedure engine (406, 408) and a data object repository (410, 412). Each of the aforementioned components of the dedicated payment system (400) are described in detail below.

In one or more embodiments of the invention, each procedure engine is configured to execute procedures associated with data objects received in messages transmitted by the transporting agent (26). More specifically, in one or more embodiments of the invention, communication of data related to the electronic commerce transaction is performed via messages transmitted by the transporting agent (26), between the virtual world entity (22) and the isolated entity (23). In one or more embodiments of the invention, the messages include data objects, each of which is associated with a procedure. When the procedure associated with each data object is executed by the procedure engine, the action associated with the data object is performed. For example, a transmitted message may include data objects that represent a business instruction related to payment for the electronic commerce transaction. In this case, the business instruction may be executed in the isolated entity by the procedure engine (412).

In one or more embodiments of the invention, the messages that carry data objects to transmit data between the virtual world entity and the isolated entity may be encrypted. Thus, although not shown in FIG. 4B, the virtual world entity and the isolated entity may include additional components related to encryption/decryption of messages as part of the procedure engine architecture. The encryption of messages transmitted by the transporting agent provides an additional layer of security.

The data objects transmitted in messages are predefined formatter files, such as XML files and data streams. In one or more embodiments of the invention, the data objects transmitted in messages are service data objects (SDO). SDO objects represent complex data structures that are used to transmit and store structured information. In order for both the virtual world entity (22) and the isolated entity (23) to understand and parse the structure of such data objects, both entities require at least one procedure engine. Said another way, the SDO objects provide a structure for the transmission of data between the virtual world entity (22) and the isolated entity (23) understood by the procedure engines of both entities. SDO objects may be retrieved from and stored as XML files. Alternatively, SDO objects may be retrieved from and stored as database records. SDO objects may represent business elements, procedures, configuration objects, and message objects. Business elements are used to communicate data related to transactional processes, account administrations, and banking information. For example, data objects may represent business procedures such as creating a buyer account, validating a transaction, performing wire transfers for payments related to the electronic commerce transaction, or any other business procedure related to the electronic commerce transaction.

Continuing with FIG. 4B, in one or more embodiments of the invention, the procedure engines (406, 408) are each operatively connected to a repository (410, 412) configured to store data objects using which messages can be generated. In one or more embodiments of the invention, the data object repositories (410, 412) store objects in XML form and are configured to retrocede the data objects from their stored XML form when the data objects are requested.

Those skilled in the art will appreciate that while only a single procedure engine is shown in both the virtual world entity and the isolated entity, multiple procedure engines may exist to facilitate data exchanges between different media, such as e-mail/sms/fax, services administration interfaces, webservices, etc. Thus, a unique procedure engine may exists on each applicative platform. Further, those skilled in the art will appreciate that while the above discussion focused on SDO objects, the present invention may be implemented using other data object types configured to support a message structure for the transmission of data. For example, the present invention may employ data structures, XML files, Java objects (i.e., Java beans), or any other object-oriented structure for the transmission of data from one entity to another. Alternatively, the message structure may be hard-coded into both the virtual world entity and the isolated entity.

The following paragraphs contain a description of the processes involved for an example electronic commerce transaction. The transaction may be subdivided in a plurality of processes. Those skilled in the art will appreciate that the transaction may be executed using the dedicated payment system (this will be referenced as "the system" in the following) previously described or an adapted version thereof as appropriate.

Figure 5:
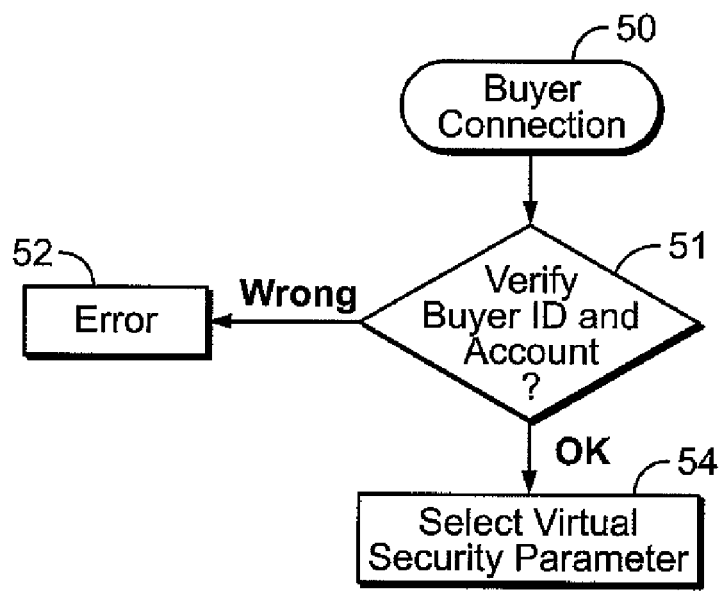
FIG. 5 shows an initialization of a transaction request as executed in a virtual world entity in accordance with one or more embodiments of the invention.

FIG. 5 illustrates the steps executed at initialisation of the transaction request. Each subscribed buyer is presumed to have an account in the system.

The steps at initialization of the transaction request are executed in the front and middle office part of the system, i.e., in the virtual world entity (not shown in FIG. 5), preferably after a buyer's off-line subscription has been registered and properly processed by the system, i.e., the virtual world database and the confidential database both on the virtual world entity and isolated entity sides have been updated with at least for the virtual world database buyer's login identification, buyer's virtual security parameter label(s), and for the confidential database buyer's real identity, buyer's banking information, buyer's security parameter (e.g. a delivery address) and other information as appropriate.

The buyer's connection 50 to the system triggers a verification 51 of buyer's login identification and account. The verification may for example be implemented by offering a typical login screen for an incoming login request from a potential subscribed buyer (not shown in FIG. 5).

If the system does not recognize the buyer, as shown by an arrow labelled "Wrong", the system enters an error handling 52. The error handling 52 may comprise various optional behaviours of the system, such as for example reinitializing the buyer's connection 50 and verification 51, or freezing the system after a number of failed recognitions (not shown in FIG. 5).

In case the buyer identification is recognized and accepted during verification 51, the buyer is connected and may subsequently in box 54 select a virtual security parameter label. The virtual security parameter label corresponds to a security parameter that is stored in the isolated entity (not shown in FIG. 5). The security parameter (and hence also the virtual security parameter label) may in fact correspond to a delivery address, but the delivery address is not disclosed, as the delivery address is not stored in the virtual world entity. The virtual security parameter label is used as a label only.

The virtual security parameter label may preferably be selected among one or more virtual security parameter labels that correspond to one or many security parameters that the buyer may have submitted to the dedicated payment systems operator at the time of subscribing off-line. The one or more virtual security parameter labels may be presented to the connected buyer in a dedicated selection interface.

Those skilled in the art will appreciate that the verification 51 of the buyer's login identification may include the use of a password. In this case, the buyer enters, together with the correct login identification, a matching password to be successfully identified. If a login screen is offered for an incoming login, a dedicated field for entering the password may have to be filled by the buyer. In one or more embodiments of the invention, the electronic commerce transaction typically corresponds to an order for an item (i.e., an object or a product) chosen on an On-line Vendor Site (OVS).

Figure 6:
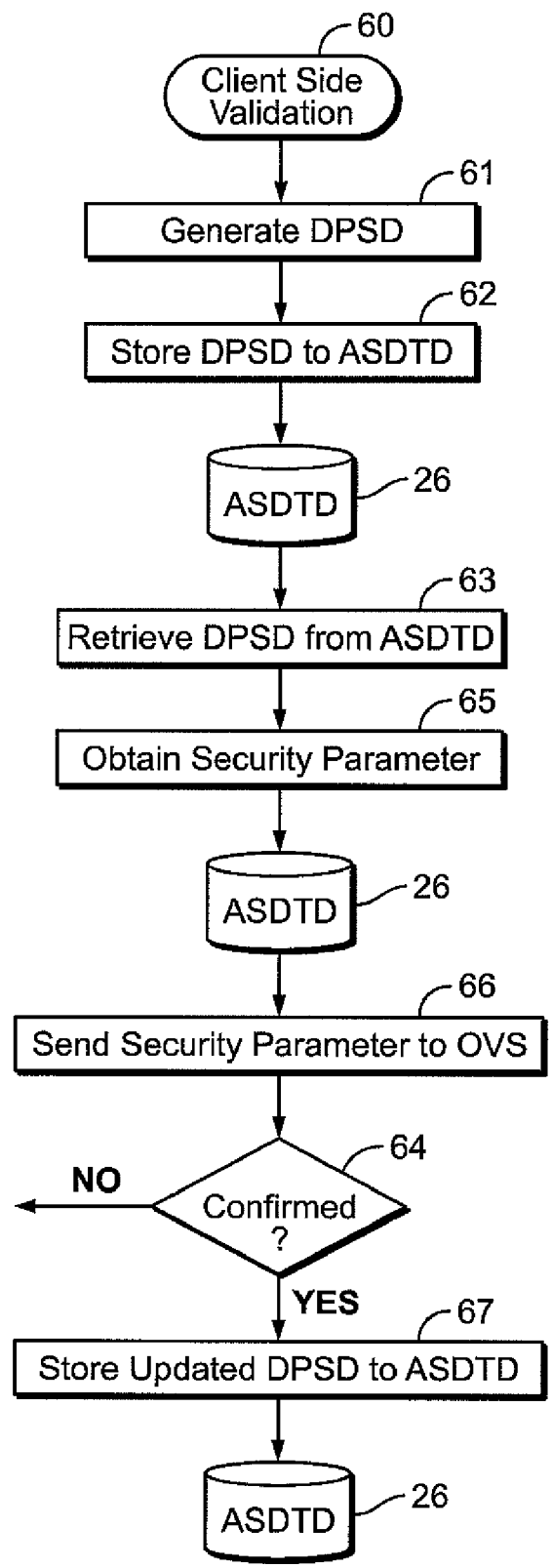
FIG. 6 shows a transaction initialisation as executed in the virtual world entity in accordance with one or more embodiments of the invention.

FIG. 6 illustrates a transaction initialization. This initialization is executed in the virtual world entity and the isolated entity of the system and ends with updated data being transferred to the isolated entity after a security parameter has been sent to the OVS.

A client side validation is initiated in box 60 to validate the transaction request. An order from the buyer, i.e., transaction information provided by the OVS as a consequence of the buyer selecting the item on the OVS (not shown in FIG. 6) is used by the system to generate Dedicated Payment System Data (61) (DPSD). Transaction information may for example comprise the price for the transaction, e.g., typically the price of the item ordered, and may also refer to the OVS by means of a transaction reference. The DPSD may typically comprise the transaction information, the login identification and the virtual security parameter label selected by the buyer in box 54 of FIG. 5.

The DPSD is stored to the ASDTD 26 in box 62 for transfer to the isolated entity (not shown in FIG. 6). The DPSD is read from the ASDTD in box 65. This occurs in the isolated entity. Using the login identification and the virtual security parameter label, the corresponding security parameter is obtained. This may for example be done with data stored in the confidential database 41 of FIG. 4. The DPSD is updated with the security parameter in the same box 65 before being stored to the ASDTD 26 for transfer to the virtual world entity.

In box 66, the security parameter and at least a part of the transaction information are transmitted to the OVS in form of delivery instructions. The transmission of the delivery instructions to the OVS is typically done over a VPN (not shown in FIG. 6). The security parameter may typically be a delivery address indicated by the buyer to the system at the time of off-line subscription to the system. The transmission of the security parameter to the OVS allows the OVS to prepare the delivery of the item or object selected by the buyer on the OVS. However, at this point the delivery typically remains "on hold" until a payment is confirmed to the OVS.

In box 64, the virtual world entity checks to see if a confirmation is received from the OVS about the delivery being handled. If no confirmation is received, as shown by the arrow labelled "No", any appropriate action may be undertaken as appropriate to either remedy to the lack of confirmation, or perhaps even cancel the transaction request.

If a confirmation is received, as shown by the arrow labelled "Yes", the DPSD is updated with this confirmation, and the newly updated DPSD is stored to the ASDTD 26 in box 67 for transfer to the isolated world.

Figure 7:
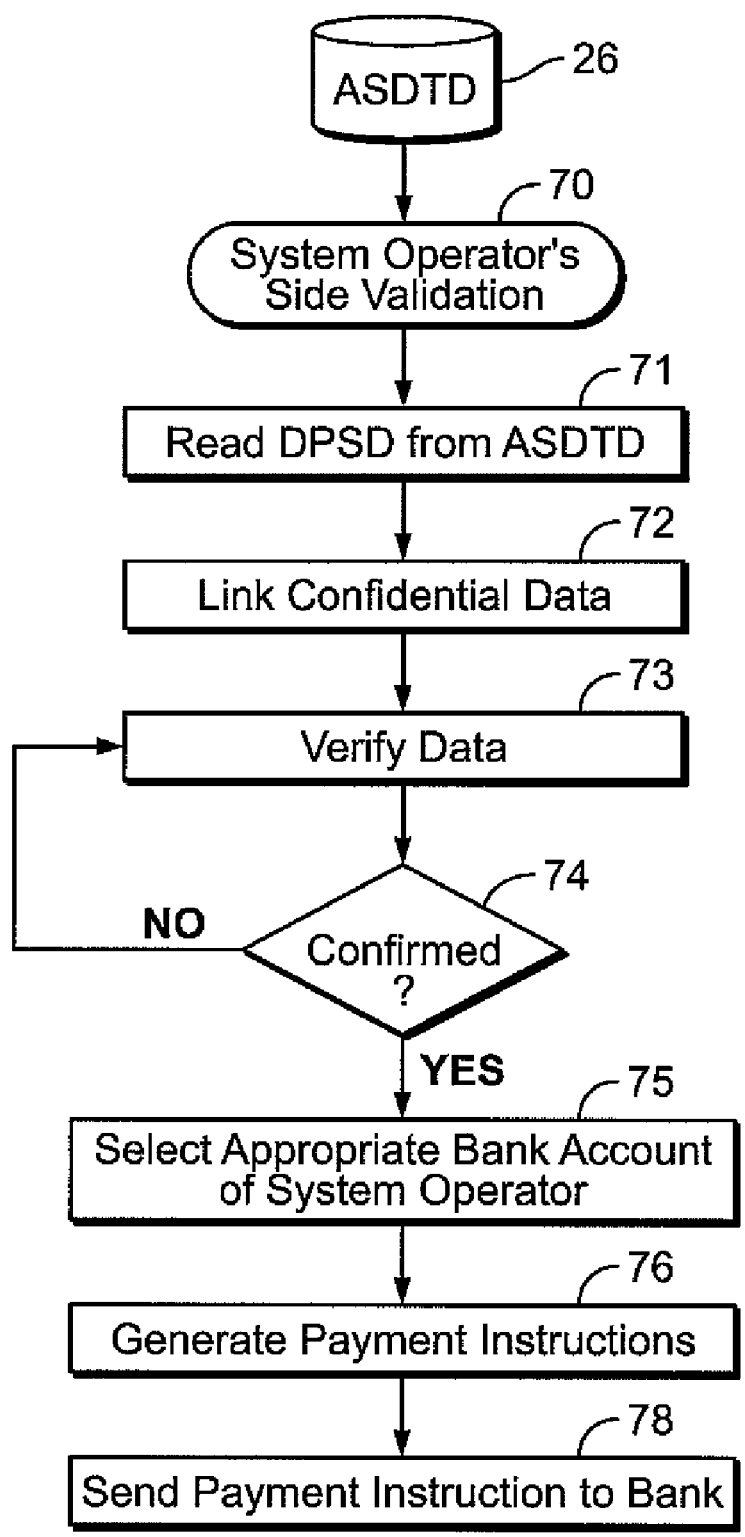
FIG. 7 shows a first part of a transaction validation process as executed in an isolated entity in accordance with one or more embodiments of the invention.

FIG. 7 illustrates a first part of validating the transaction. This first part of validating is executed in the isolated entity part of the system, starts with reading DPSD from the ASDTD and ends with instruction for debit being sent to a bank.

A system operator's side validation is initiated in box 70 to validate the transaction on the isolated entity side of the system. The DPSD as generated in FIG. 6 and stored on the ASDTD 26 are read from the ASDTD at box 71. In box 72, the login identification comprised in the DPSD is used in the isolated entity to retrieve the real identity of the buyer and the corresponding banking information. This is done by means of the confidential database 41 described in FIG. 4.

Subsequently, as shown in boxes 73 and 74, various tests may be performed to verify for example a coherence of the DPSD, the real identity of the buyer, the corresponding banking information and possibly the transaction information contained in the DPSP, i.e., the price for the transaction and the transaction reference.

In case a problem arises at the step of verifying 74, the system may seek to perform additional verifications and possibly take the transaction to a halt as represented by arrow "no" in FIG. 7. Action taken at this arrow labelled "No" is optional and may be adapted as appropriate.

In the case of confirmation, i.e., arrow "yes", an appropriate bank account of the system's operator is selected (75), and payment instruction, e.g., instructions for debit from buyer's bank account of an amount corresponding to the price for the transaction are generated (76) using the confidential banking information of buyer's subscription account. The system operator's side validation ends by sending (78) of the payment instructions to a bank, i.e., the appropriate bank selected in box 75.

Figure 8:
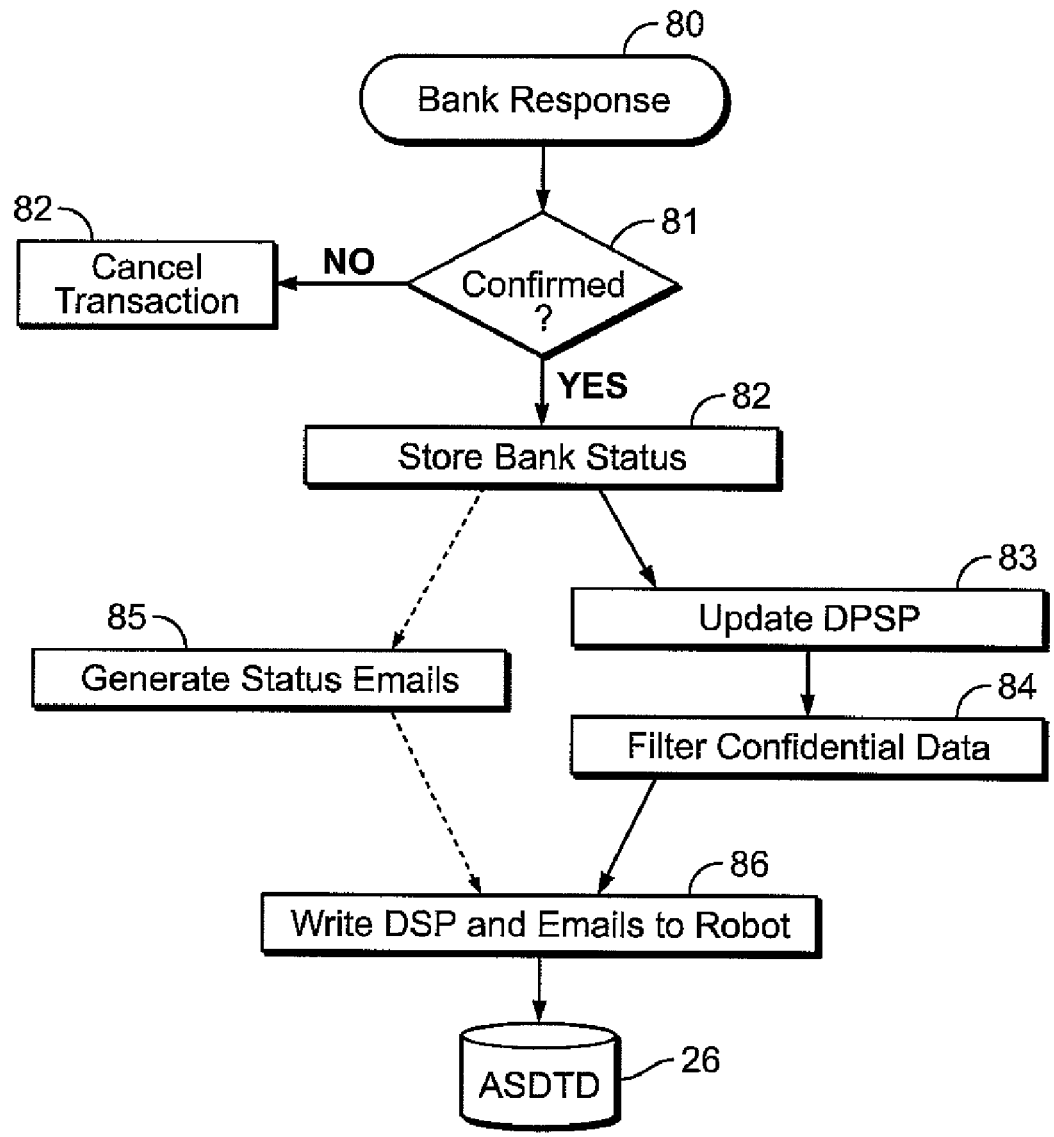
FIG. 8 shows a second part of a transaction validation process as executed in an isolated entity in accordance with one or more embodiments of the invention.

FIG. 8 illustrates a second part of validation of transaction that occurs after a response is received from the bank as a result from sending payment instructions in box 78 of FIG. 7. Typically the bank may respond with a confirmation of handling of the payment instructions previously received by the bank followed by a confirmation of effective payment.

The bank response 80 triggers the resuming of the transaction validation process starting with an evaluation 81 of the response. In case the bank submits a negative response, e.g., the instructions for wire may not be accepted, this may lead to an arrow labelled "No" in FIG. 8 and eventually to cancelling the transaction (82). Step 82 is optional and may be replaced by any other action as appropriate, such as for example a verification and a re-scheduling of the payment instructions.

An arrow labelled "Yes" corresponds to a positive response of the bank, meaning for example that the wire instructions are acknowledged and that the requested amount of money will or has been transferred between designated bank accounts, e.g., from buyer's bank account to system operator's bank account. The response of the bank is stored as bank status in the isolated entity at the level of box 82 and followed by an updating 83 of the DPSP in line with the bank status. The system then proceeds to filters (84) the DPSP for confidential data, i.e., eliminates all data added to the DPSP by the isolated entity such as real identity and/or banking information and/or security parameter.

In an asynchronous process, the system may generate status emails 85 to be sent later on by the virtual world entity to the buyer. Such status emails may for example have the purpose of informing the buyer about the status of the order, i.e., the status the electronic commerce transaction. Finally, the updated DPSP and possibly the status emails are written (86) to the ASDTD 26. The ASDTD 26 may subsequently be disconnected from the isolated entity of the system, and switched to the virtual world entity of the system (both not shown in FIG. 8).

Figure 9:
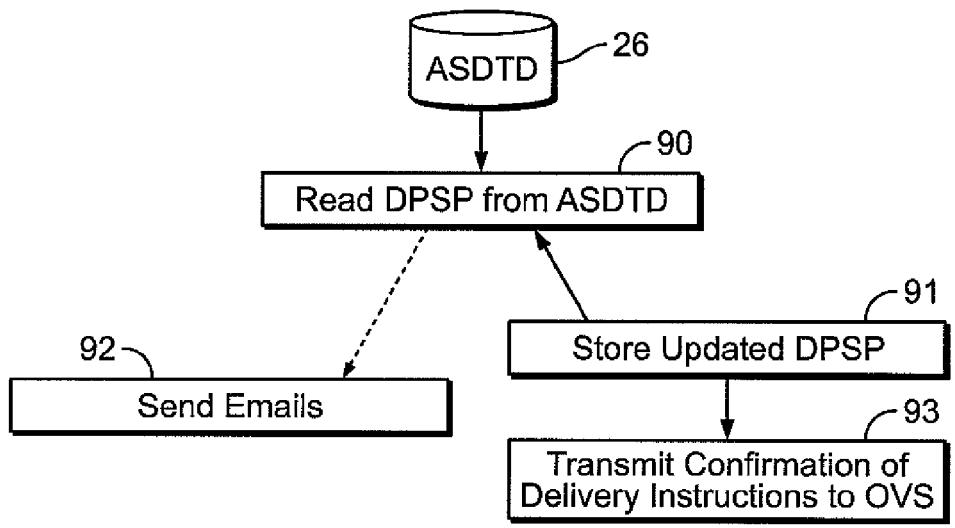
FIG. 9 shows a third part of a transaction validation process as executed in the virtual world entity in accordance with one or more embodiments of the invention.

FIG. 9 illustrates a part of the transaction after receipt at the system's virtual world entity (not shown in FIG. 9) of DPSP updated in line with the response from the bank.

The ASDTD 26 is switched from the isolated entity to the virtual world entity. A step corresponding to box 90 consists in reading the DPSP and possible emails prepared by the isolated entity. This is followed by a storing 91 of the (updated) DPSP and possibly also in the sending of email messages (92).

If a positive response from the bank is received in FIG. 8, the system generates and transmits (93) confirmation of delivery instructions to the OVS. The delivery that was "on hold" up to this point may now be executed by a delivery service. Typically, a delay of 48 hours may be deliberately included between steps 91 and 93 for security reasons.

The delivery service is in charge of delivering the item(s) subject of the electronic commerce transaction, from a delivery provider designated by the OVS to the delivery address, i.e., the security parameter. The delivery service may obtain a confirmation or proof of receipt from the buyer or a representative thereof upon delivery of the item at the delivery address. The confirmation or proof of receipt assures that the items are delivered to the selected delivery address as agreed upon between the subscribed buyer and the system operator. This is a unique security feature of the system, since any fraudulent use of buyer's identification by an unauthorised user or thief may not result in the item being delivered to the unauthorised user or thief. As will be described later on, the OVS cannot be paid by the system operator unless the item is delivered to and confirmed by the subscribed buyer.

In the event that the item(s) are material and need to be transported, the delivery service may for example be the postal services or a courier service. In the event that the item(s) are in the form of software or are of immaterial nature, the delivery may be a download service provider or any other type of delivery service as appropriate.

Figure 10:
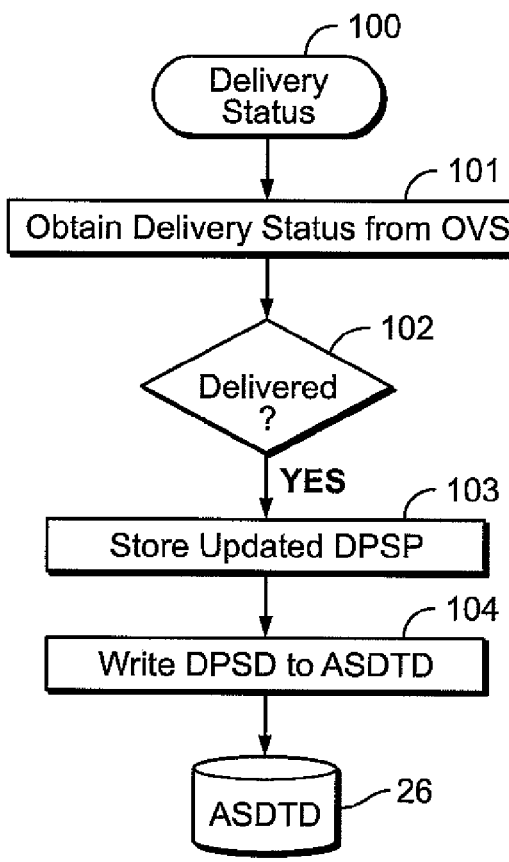
FIG. 10 shows a fourth part of a transaction validation process as executed in the virtual word entity in accordance with one or more embodiments of the invention.

FIG. 10 illustrates a fourth part of transaction validation that occurs after a response is received from the delivery service as a result from delivering the item ordered and obtaining a confirmation therefore.

A delivery status 100 as obtained by OVS from the delivery service is transmitted from the OVS to the virtual world entity in box 101 of FIG. 10. In case (102) the delivery could not be made or any other problem occurred (not shown in FIG. 10), the transaction is cancelled and the buyer reimbursed. In the opposite case, the arrow "Yes" leads to a storing 103 of updated DPSP that includes the confirmation of delivery. The updated DPSP is once more written (104) to the ASDTD 26. The ASDTD 26 may subsequently be switched from the virtual world entity of the system, to the isolated entity (both not shown in FIG. 10).

Figure 11:
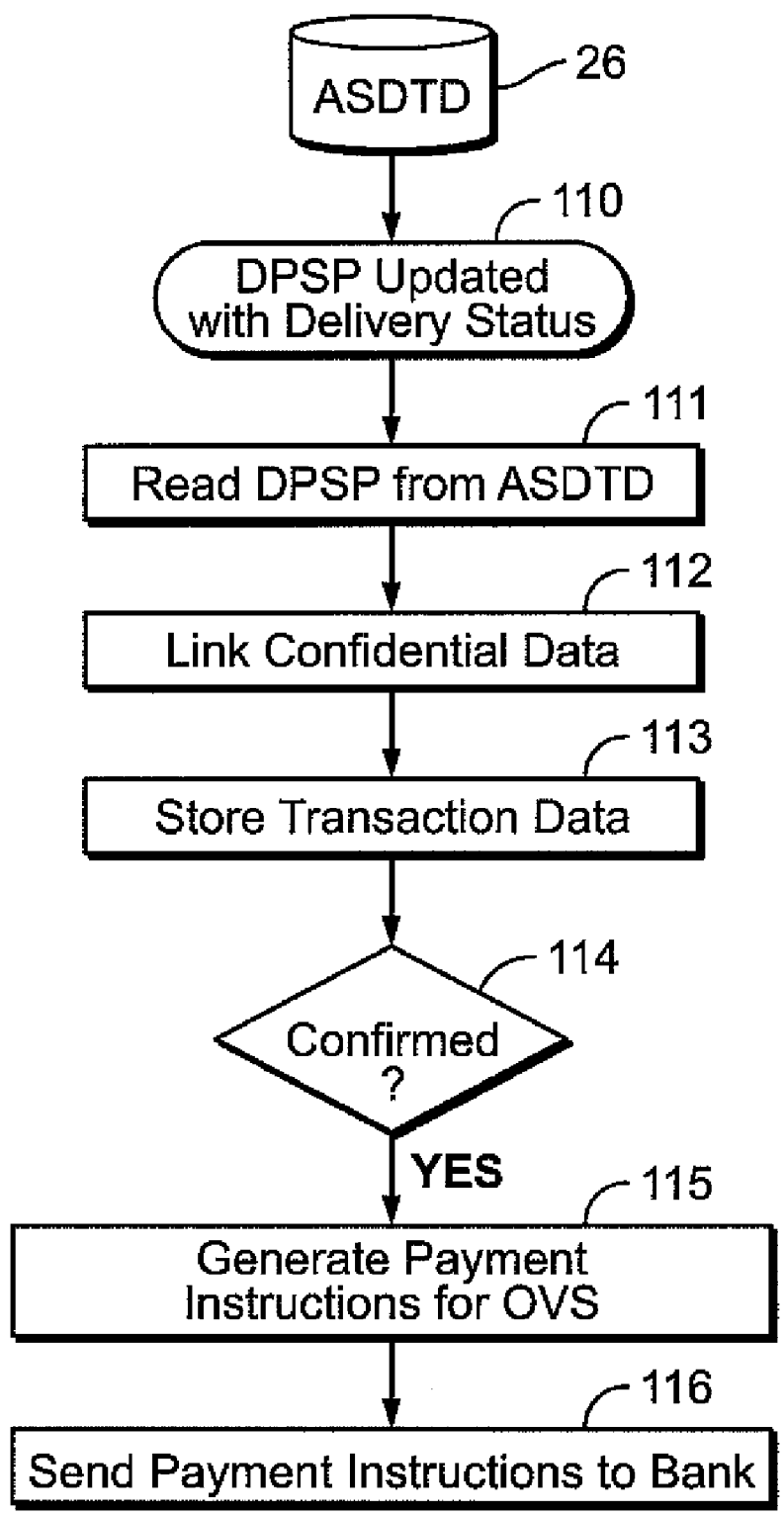
FIG. 11 shows a fifth part of a transaction validation process as executed in the isolated entity in accordance with one or more embodiments of the invention.

FIG. 11 illustrates a fifth part of validating the transaction. This fifth part of validating is executed in the isolated entity of the system, starts with reading DPSP from the ASDTD and ends with payment instructions for the OVS wire being sent to a bank. DPSP updated with the delivery status as explained in FIG. 10, is provided in box 110 through the ASDTD 26. The DPSP is read from the ASDTD in box 111.

Recall that any data handled in and provided by the virtual world entity (not shown in FIG. 11) does not allow to identify the actual real buyer concerned by the transaction. The link between the buyer's login identification at the virtual world entity and buyer's real identity is made only in the isolated entity (not shown in FIG. 11). Accordingly, in box 112, the login identification of the buyer is used to gather real identity of the buyer by means of the real buyer database. The updated DPSP is stored is the isolated entity at box 113.

Subsequently, as represented in box 114, various coherence tests may be performed to verify the DPSP and the identity of the buyer. In case the verification turns out to reveal an error various measures may be implement as appropriate but are not shown in FIG. 11.

In case of confirmation, i.e., arrow "yes", the system generates payment instructions for paying the OVS (115) from a system operator's bank account to a OVS's account of the amount of money corresponding to the transaction. The payment instructions may possibly include the transaction reference of the electronic commerce transaction, as included in the transaction information.

It is reminded that the amount of money corresponding to the transaction was transferred from buyer's bank account to the system operator's account prior to delivery of the item concerned by the transaction.

The fifth part of the transaction validation ends by sending (116) of the payment instructions to the system operator's bank. This last step 116 is preferably executed through a proprietary network.

Figure 12:
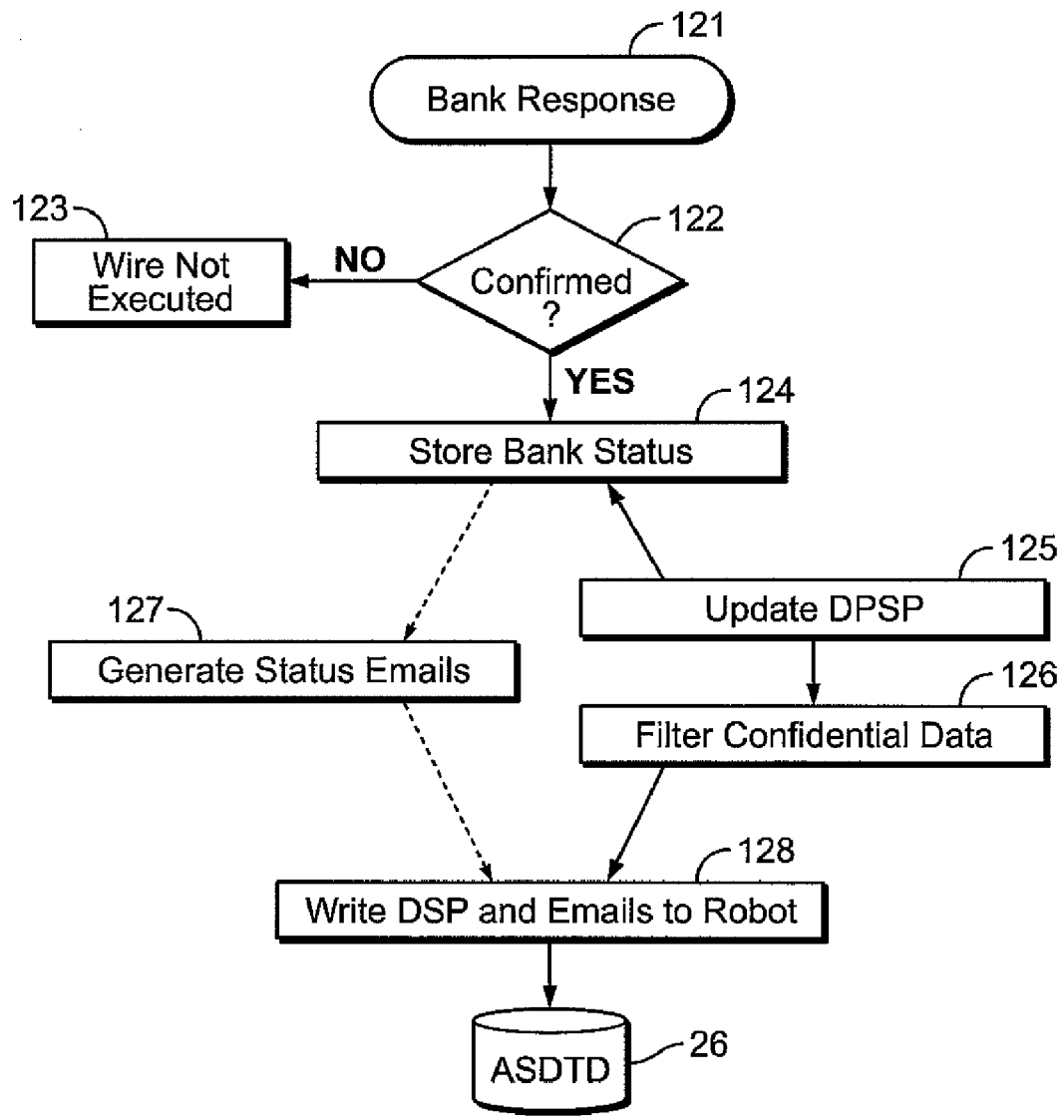
FIG. 12 shows a sixth part of a transaction validation process as executed in the isolated entity in accordance with one or more embodiments of the invention.

FIG. 12 illustrates a part of validation that occurs after a response is received from the bank as a result from sending payment instructions in box 116 of FIG. 11.

The bank response 121 triggers the resuming of the transaction validation process starting with an evaluation 122 of the bank response. In case the bank submits a negative response, e.g., the payment instructions may not be accepted, this may lead to an arrow labelled "No" in FIG. 12 and eventually to a specific status 123 wherein the payment is not executed. Specific measures may possibly be implemented to tackle this situation but will not be developed here in more detail. All action that may be undertaken at the arrow "No" remains optional.

An arrow labelled "Yes" corresponds to a positive response of the bank, meaning for example that the payment instructions are acknowledged and that the requested amount of money will or has been transferred between the designated bank account, i.e., from the system operator's bank account and the OVS's bank account. The response of the bank is stored as bank status in box 124 and followed by an updating 125 of the DPSP in line with the bank status. The system then filters (126) the DPSP for confidential data, i.e., eliminates all data added to the transaction data by the isolated such as real identity and/or banking information and/or security parameter In an asynchronous process, the system may generate status emails 127 to be sent later on to the buyer by the virtual world entity. Such status emails may for example have the purpose of informing the buyer that the transaction has been made.

Finally, the updated DPSP and possibly the status emails are written (128) to the ASDTD 26. The ASDTD 26 may subsequently be switched from the isolated entity of the system to the virtual world entity (both not shown in FIG. 12).

Figure 13:
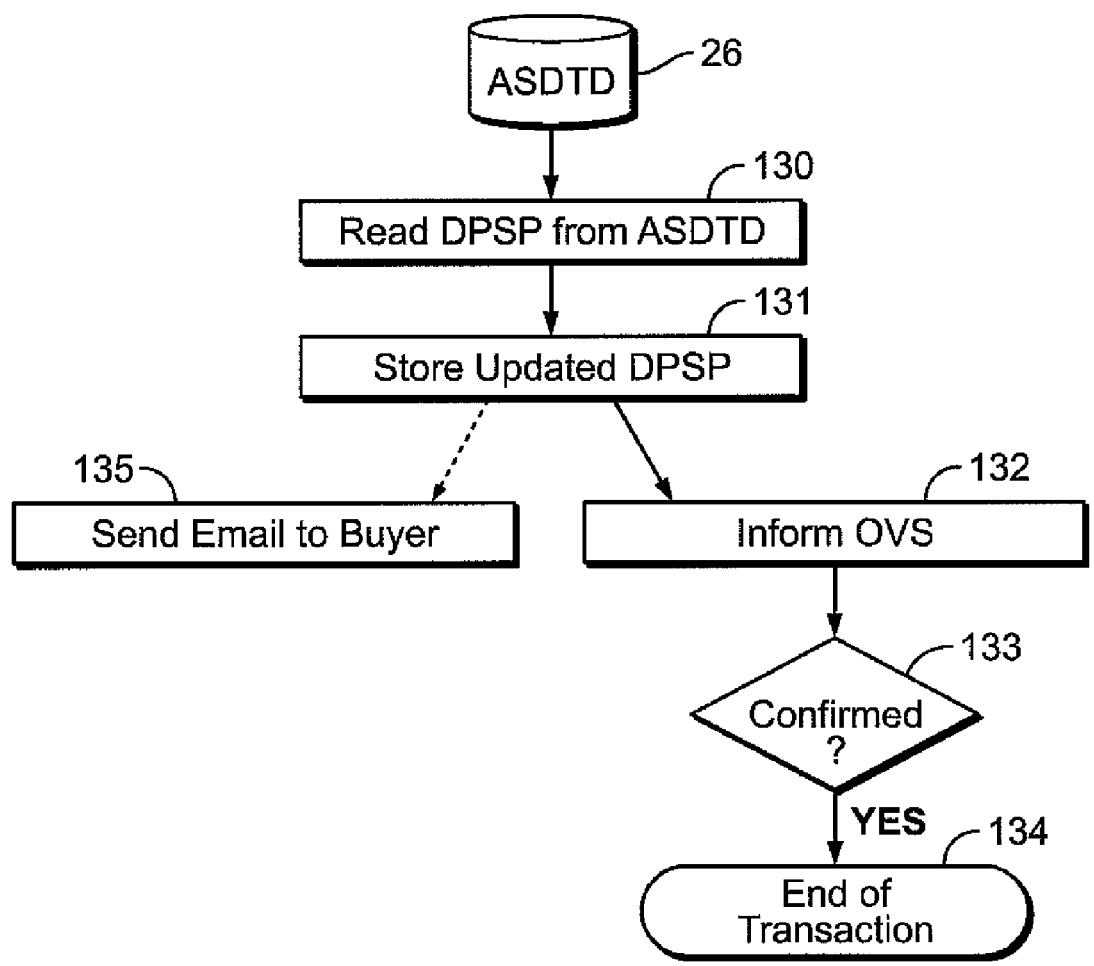
FIG. 13 shows a finalization of a transaction validation process as executed in the virtual world entity in accordance with one or more embodiments of the invention.

FIG. 13 illustrates a part of the transaction after receipt at the system's virtual world entity (not shown in FIG. 13) of DPSP updated in line with the response from the bank obtained in FIG. 12. The ASDTD 26 is switched to the virtual world entity.

A step corresponding to box 130 consists in reading the DPSP and possible emails prepared by the isolated entity. This may be followed by a storing 131 of the (updated) DPSP and the sending of email messages (135). One example of email messages is a status update message, e.g., a confirmation of delivery and completion of transaction. This type of message is to be send to the buyer. Those skilled in the art will appreciate that messages may be sent to the buyer in other forms, such as text messages.

The OVS is informed in box 132 that payment for the transaction has been made to OVS's bank account, in order for the OVS to verify this on bank statements and confirm the obtained payment. In the event that the OVS does not confirm receipt of payment in box 133, this is shown by an arrow labelled "No" in FIG. 13, and may lead for example to the sending of further emails to the OVS or any other measure as appropriate. In the event that the OVS confirms receipt of payment, as shown by an arrow labelled "Yes" in FIG. 13, the electronic commerce transaction comes to an end 134.

Figure 14:
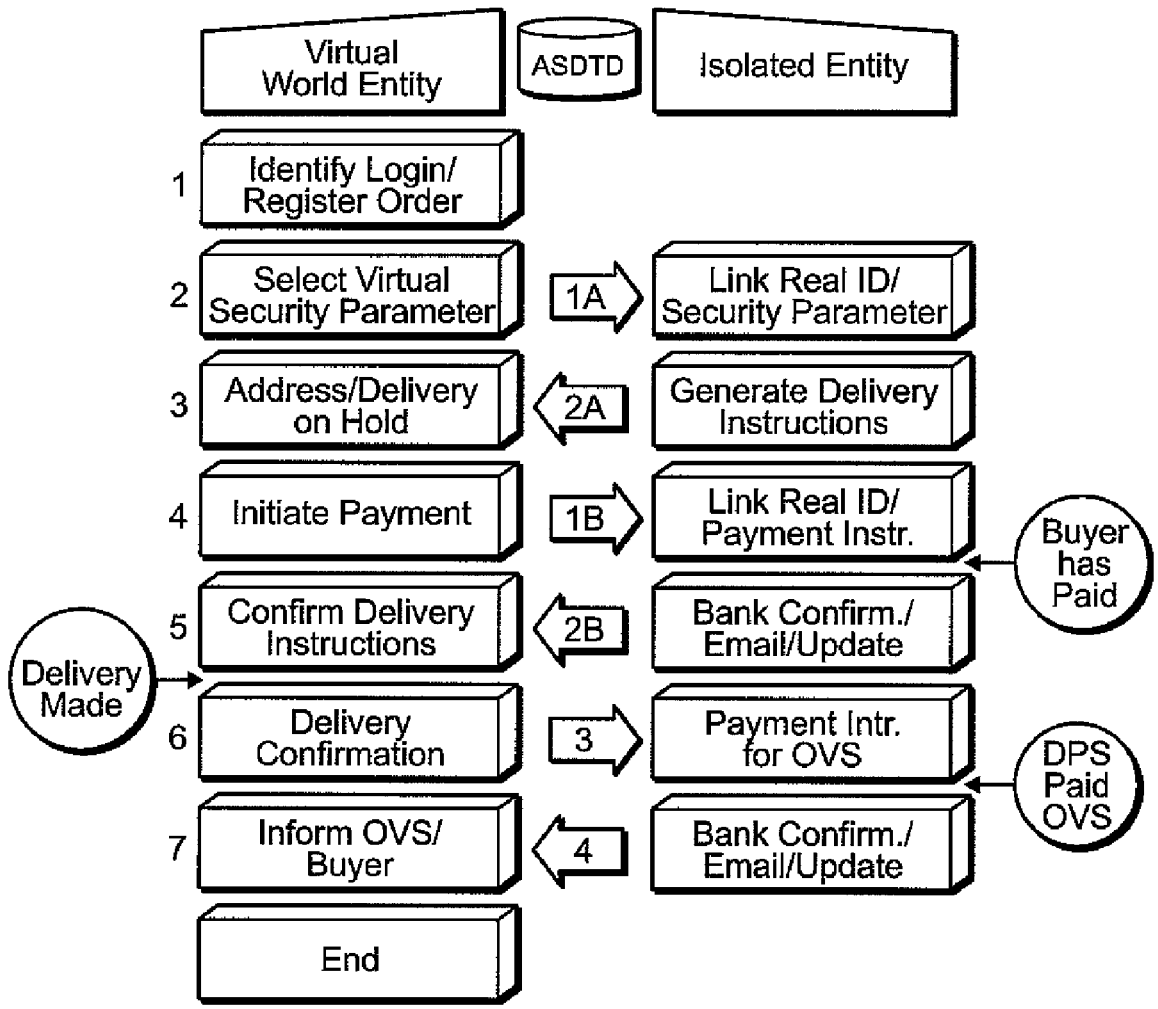
FIG. 14 shows an overview of a complete transaction validation process according to one or more embodiments of the invention.

FIG. 14 illustrates an overview of all transaction validation parts that together form an electronic commerce transaction process.

The left column represents transaction validation parts executed in the virtual world entity of the system, i.e., in the front office and middle office of the system.

The central column is headed by a schematic representation of the ASDTD to show that use of the switch is made. An arrow in this column indicates a use of the ASDTD and the direction in which it is switched, e.g., Arrow 1A shows that the ASDTD is switched after the part of Selecting a Virtual security parameter label, and that it is switched from the virtual world entity to the isolated entity. Those skilled in the art will appreciate that before being switched, the ASDTD is "connected" to the virtual work entity, then switched there from, to be "connected" to the isolated entity. Similar explanations apply to arrows 2A, 1B, 2B, 2, 3 and 4 but must be adapted in view of the arrow's line position in the overview and its direction of pointing.

The right column represents transaction validation parts executed in the isolated entity of the system, i.e., in the back office of the system. In line 1 of the overview, the "Identify login/Register order" box corresponds to steps explained in relation to FIG. 5 and FIG. 6, wherein the buyer connects to the system using the login identification, and transaction information from the vendor is registered.

In line 2 of the overview, the "Select Virtual security parameter label" box corresponds to step 54 explained in relation to FIG. 5, where the virtual security parameter label is selected, and box 61 of FIG. 6 where DPSP is generated for the first time. The process subsequently proceeds to arrow 1A.

Further in line 2 of the overview, the "Link Real ID/Security Parameter" box corresponds to box 65 explained in relation to FIG. 6, wherein the real identity and the security parameter corresponding to the login identification and virtual security parameter label are retrieved inside the isolated entity. In line 3, the right column, the box "Generate Delivery Instructions" corresponds to action undertaken at the level of box 65 in FIG. 6, where delivery instructions are prepared for the OVS. The process proceeds to arrow 2A.

Further, in line 3, left column, the box "Address/Delivery on hold" corresponds to action undertaken in box 66 of FIG. 6, where delivery instructions are sent from the virtual world entity to the OVS, using the VPN. At this point, the delivery instructions handled by the OVS are "on hold", i.e., waiting for confirmation to be issued by the virtual world entity. In line 4, left column, the box "Initiate payment" corresponds to action undertaken in box 67 of FIG. 6, wherein updated DPSP is transferred to the isolated entity. The process proceeds to arrow 1B.

Further in line 4, right column, the "Link Real ID/Payment instructions" box corresponds to steps explained in relation to FIG. 7, wherein the login identification of the buyer is used to link to the real identity, which is kept confidential in the isolated entity of the system, and the system generates payment instructions intended to the bank of the system operator.

Between lines 4 and 5, the arrowed circle on the far right indicates that the "Buyer has paid", meaning that the bank account of the buyer has been or will certainly be debited of the amount corresponding to the price of the transaction.

In line 5 of the overview, right column, the "Bank confirm/email/update" box corresponds to steps explained in relation to FIG. 8, wherein a confirmation of the payment instructed be obtained from the bank and the system generates emails and updated DPSP. The process proceeds to arrow 2B.

In line 5 of the overview, left column, the "Confirm delivery instructions" box corresponds to steps explained in relation to FIG. 9, wherein confirmation for the delivery instructions are sent out from the virtual world entity to the OVS. Between lines 5 and 6, the arrowed circle on the far left indicates that "Delivery (is) made", i.e., the OVS has confirmed that delivery is successful.

In line 6 of the overview, left column, the "Delivery confirmation" box corresponds to steps explained in relation to FIG. 10, wherein a confirmation of delivery is obtained from the OVS a the virtual world entity and updated DPSP is generated. The process then proceeds to arrow 3.

In line 6 of the overview, right column, the "Payment instructions for OVS" box corresponds to steps explained in relation to FIG. 11, wherein payment instructions for the system operator's bank are generated to pay the OVS. Between lines 6 and 7, the arrowed circle on the far right of the illustration indicates that the Dedicated Payment System operator has paid the OVS.

In line 7 of the overview, right column, the "Bank confirm./email/update" box corresponds to steps explained in relation to FIG. 12, wherein confirmation of payment to the OVS is received and updated DPSP generated. The process proceeds to arrow 4. In line 7 of the overview, left column, the "Inform OVS/Buyer" box corresponds to steps explained in relation to FIG. 13, wherein the OVS is informed about the payment the buyer is emailed and the transaction comes to an end.

The overview shows that during the processing of the transaction, the ASDTD is switched 6 times between the first entity and the second entity. Every time the robot is switched, the processing is delayed. In other words the completion of the processing for the transaction may not be completed instantly because it involves different entities that are physically and electronically disconnected.

Those skilled in the art will appreciate that a buyer may not connect to the dedicated payment system if the buyer has not previously subscribed to the system. If the buyer tries to connect to the system without having subscribed to the system, his/her connection attempts fail. This becomes apparent from FIG. 5 and accompanying explanations.

Figure 15:
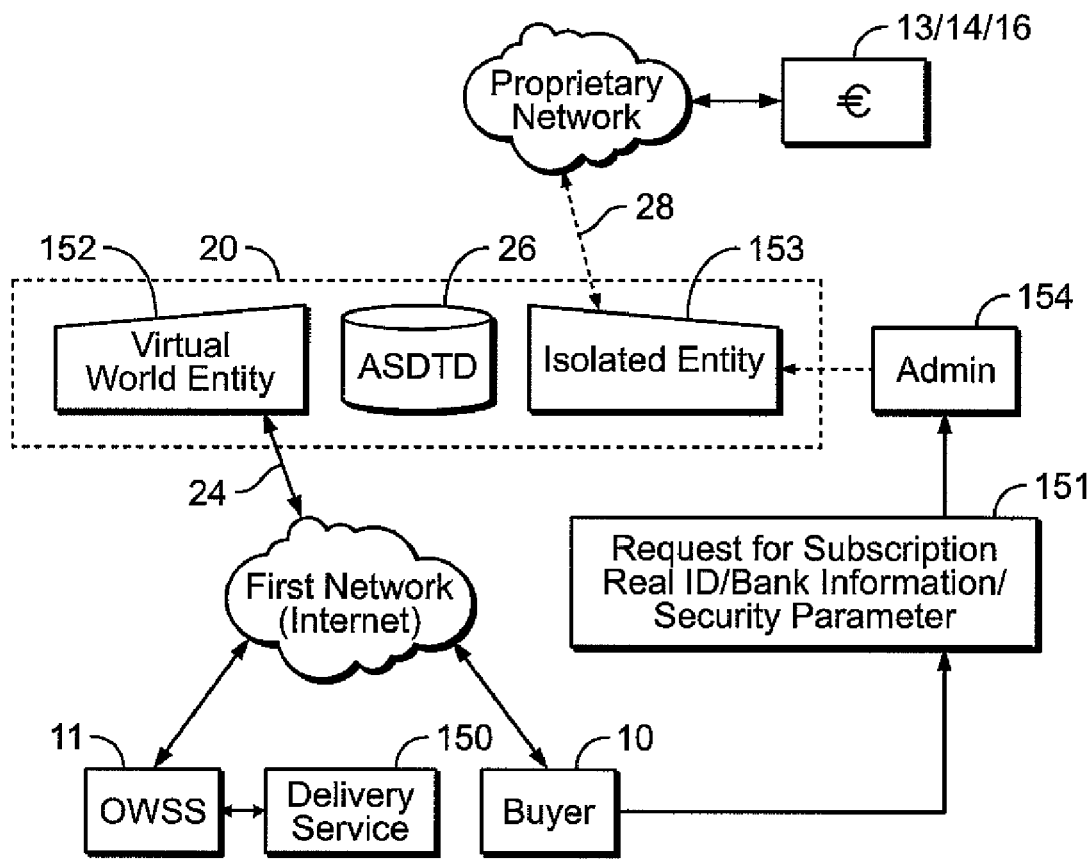
FIG. 15 shows an overview of a dedicated payment system and its actors according to one or more embodiments of the invention.

FIG. 15 contains an overview of the dedicated payment system 20, comprising the virtual world entity 152, the ASDTD 26 and the isolated entity 153. The virtual world entity 152 exchanges data with the isolated entity 153 over the ASDTD 26 only.

The overview in addition illustrates the actors surrounding the dedicated payment system 20. The actors include:

The buyer 10 who communicates with the virtual world entity 152 over the first network, e.g., the internet. The virtual world entity 152 is connected to the first network through network communication arrow 24;

The OVS 11 that communicates with the virtual world entity 152 over the first network. Those skilled in the art will appreciate that more than one OVS may be involved. However only one OVS is shown for reasons of a better readability of the Figure. It is further understood that the buyer 10 may communicated with the OVS over the first network, in particular when making an on-line selection of items to buy for the electronic commerce transaction;

The delivery service 150 that communicates with the OVS. The communication may optionally go over the first network. Those skilled in the art will appreciate that more than one delivery service may be involved. However only one delivery service is shown in FIG. 15 for a better readability of the Figure;

The banks, including the buyer's bank 13, the dedicated payment system operator's bank 14, and the OVS's bank 16. All banks have been gathered in a single box for better readability. Those skilled in the art will appreciate that many more banks may be involved. In particular, the dedicated payment system operator may have a plurality of dedicated banks. However, only the dedicated payment system operator's bank(s) communicate(s) with the isolated entity 153 over the proprietary network, as shown by the dotted double arrow 28.

In order to subscribe to the dedicated payment system 20, the buyer 10 sends a subscription request to an administration entity 154 of the dedicated payment system, thereby transmitting at least his/her real identity, one or a plurality of security parameters, bank information and possibly corresponding labels or virtual corresponding names for the security parameters and the bank information. If the buyer's subscription request is accepted, this has the effect that the confidential database (not shown in FIG. 15) of the isolated entity 153 is informed about the new subscribed buyer by the administration entity and a new login Identification, and possibly a password is issued to the buyer 10.

The login Identification may also have been explicitly indicated by the buyer in his/her subscription request and subsequently accepted by the system.

The subscription request may not be send over the first network because this would potentially make the information contained in the request, which is confidential information, available to a person listening on the first network. Instead the subscription request must be transmitted through other routes, e.g., through a courier 151, by conventional postal services or handed in by hand.

Figure 16:
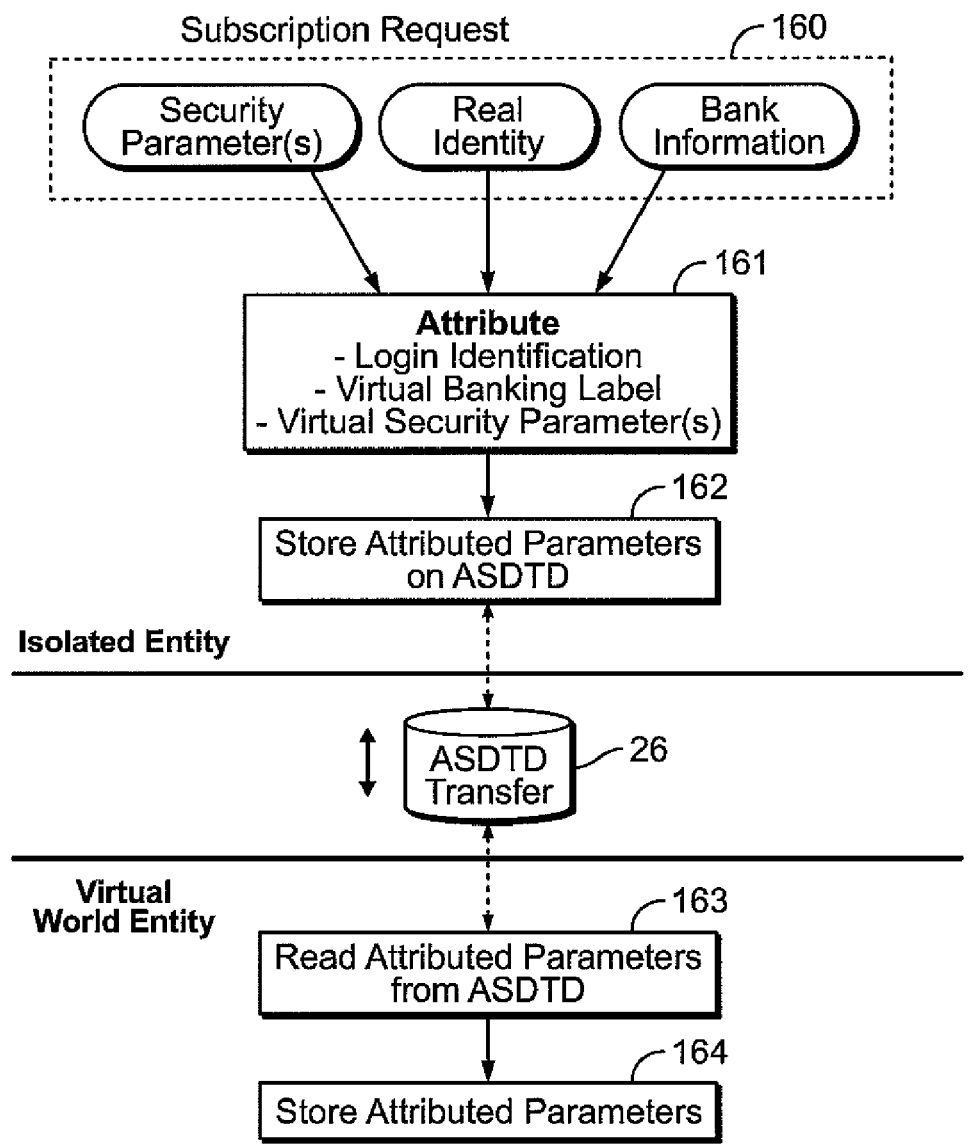
FIG. 16 shows a process of subscription to be executed prior to an electronic commerce transaction in accordance with one or more embodiments of the invention.

FIG. 16 illustrates the process implemented inside the dedicated payment system 20 to subscribe a buyer to the system and create a login identification for the buyer in view of future connections to the virtual world entity of the system.

Departing in the isolated entity of the system, from a subscription request 160 including at least a real identity, banking information and security parameter(s) of the buyer, a login identification, virtual banking label and virtual security parameter label(s) are attributed in step 161. The Attribution may be made manually if the buyer expresses a preference for a particular login identification, label or virtual parameter. Those skilled in the art will appreciate that the login identification should preferably not be suggestive of buyer's real identity, nor should a virtual security parameter label allows deduction of the real security parameter. Those skilled in the art will appreciate that the subscription request is not directly fed to the isolated entity by the buyer. The subscription request is handled by a dedicated administration entity (not shown in FIG. 16) for obvious security reasons.

The attributed parameters, i.e., the login identification, the virtual banking label and the virtual security parameter label(s) are stored (162) on the ASDTD 26 for transfer to the virtual world entity of the system.

After switching the ASDTD 26 from the isolated entity to the virtual world entity, the attributed parameters, i.e., the login identification, the virtual banking label and the virtual security parameter label(s) are read (163) from the ASDTD and stored in the virtual world entity (164).

The system is now prepared to accept an incoming connection to the first entity through the first network by the buyer. The buyers may now be recognised by the system through the use of the attributed login identification. Those skilled in the art will appreciate that additional security may be achieved if the login identification is used in conjunction with a password known to the buyer only. The depicted method of FIG. 16 may easily be adapted to provide such a password to the virtual world entity.

Figure 17:
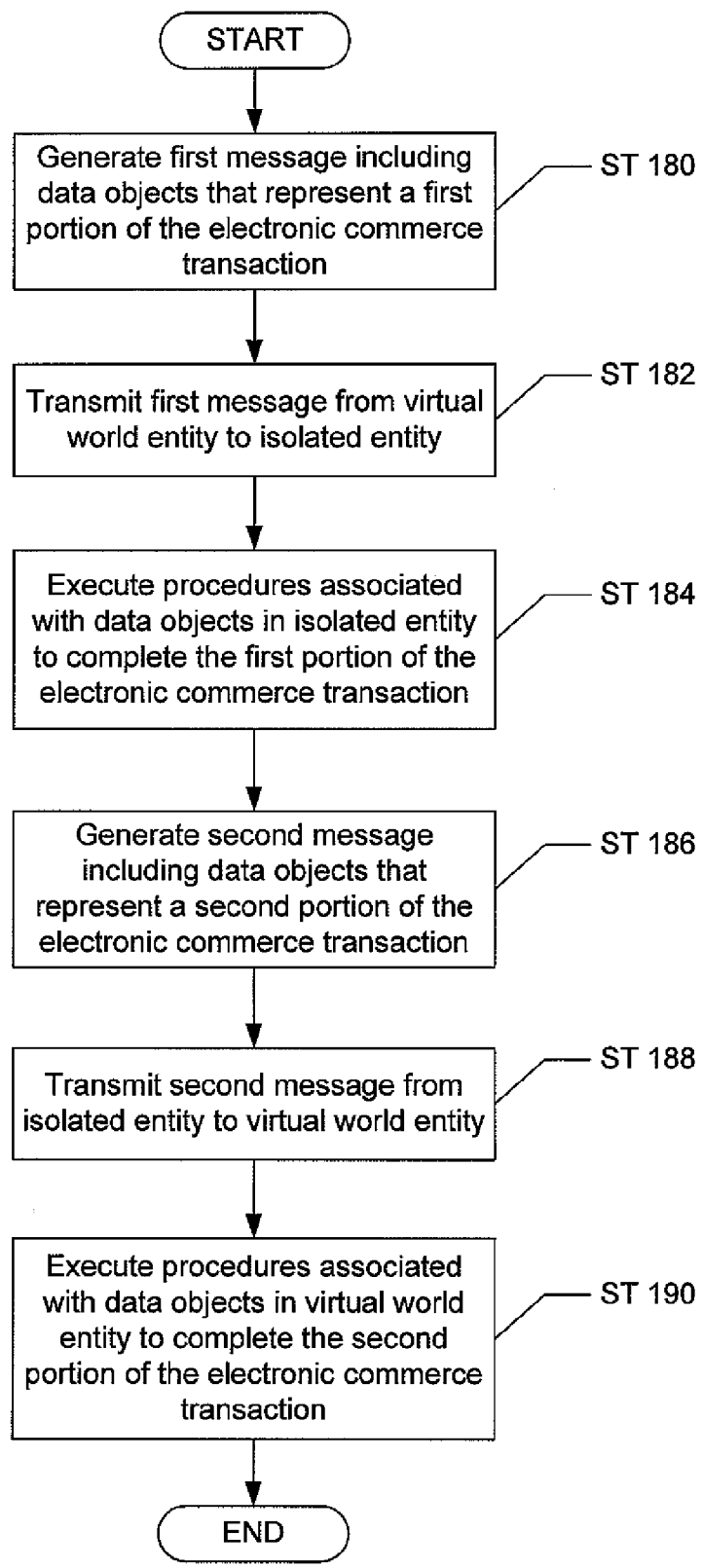
FIG. 17 shows a flow chart in accordance with one or more embodiments of the invention.

FIG. 17 shows a flow chart in accordance with one or more embodiments of the invention. Specifically, FIG. 18 describes an example of a process for transmitting data between the virtual world entity and the isolated entity via the transporting agent.

Initially, a first message is generated that includes data objects representing a first portion of the electronic commerce transaction (Step 180). For example, the first portion of the electronic commerce transaction may involve data related to the price of the object/product purchased by the buyer of the electronic commerce transaction. This information, contained in the first message, is subsequently transmitted from the virtual world entity to the isolated entity via the transporting agent (Step 182). At this stage, procedures associated with the data objects transmitted in the message are executed by the procedure engine associated with the isolated entity (Step 184). When such procedures are executed, the first portion of the electronic commerce transaction may be completed. For example, a transaction ID associated with the electronic commerce transaction performed by the buyer may be stored, and the payment price for the purchased object/product may be relayed to the isolated entity. The isolated entity may then generate instructions to the buyer's bank to withdraw an amount equivalent to the payment price from the buyer's account and place the amount in a system operator account or another neutral account that is known only to the isolated entity and the buyer's bank.

Subsequently, the isolated entity may generate a second message using the data object repository associated with the isolated entity (Step 186). The second message may be in response to the first message, or may be, in one or more embodiments of the invention, unrelated to the first message. The second message may represent a second portion of the electronic commerce transaction, and may, for example, contain instructions to deliver the purchased object/product to the buyer after confirmation of the transfer of payment from the buyer's bank account to the system operator account is received. The isolated entity's second message is subsequently transmitted from the isolated entity to the virtual world entity (Step 188). Finally, the procedures associated with the data objects contained in the second message are executed by a procedure engine associated with the virtual world entity (Step 190).

Those skilled in the art will appreciate that the process shown in FIG. 17 may repeat, as various portions of the electronic commerce transaction are executed by each of the virtual world entity and the isolated entity. That is, as data needs to be communicated between the virtual world entity and the isolated entity, messages may be generated, transmitted, and executed on each end of the dedicated payment system in accordance with the process described above.

Advantageously, with use of the dedicated system payment according to the invention, the buyer makes his orders on internet as usual, i.e. using the existing web vendor sites. The features of the invention, i.e., the use of the dedicated payment system may for example be made accessible through integration of a web-link to the dedicated payment system's website in the concerned web shopping sites. Hence no major change needs to be made to existing web vendor sites.

The invention allows the web shopping sites to delegate responsibility for payment and outsource payment to the dedicated payment website operator. Each partner in the transaction has its' own bank. The dedicated payment website operator does not need to directly interact with each bank, and may limit the interaction with banks to interactions with its' own banks.

No personal i.e., confidential, information of the buyer is ever transited on the internet. The personal information is stored at the dedicated payment website on a server in the isolated entity of the dedicated payment system, which never gets connected to any public network. Hence access to personal information through a publicly available network is made impossible for potential thieves.

The use of security parameters and their virtual counterparts, i.e., the virtual security parameter labels, allows the reliability and security of electronic commerce transactions made with the inventive system and method to be increased. The security parameter needs to be fulfilled in order for the electronic commerce transaction to be complete. If the security parameter is a delivery address, then the security parameter is fulfilled by including the address in to the process corresponding to a type of this transaction, i.e., in this case a physical product delivery transaction. The security parameter is never transited or disclosed on the publicly available network. Instead virtual security parameter labels, i.e., security parameter labels are used. The virtual security parameter labels are agreed upon with the buyer to represent the security parameters without actually disclosing them. While the described invention uses delivery addresses as examples for security parameters, those skilled in the art will appreciate that other types of security parameters may be used for other types of transactions, and may as such be adapted to a particular type of electronic commerce transaction. The security parameter may be a car license plate if the system is used for paying traffic fines. In this case, the virtual security parameter label could for example be "my first car" for a first license plate, and "my second car" for a second license plate.

Figure 18:
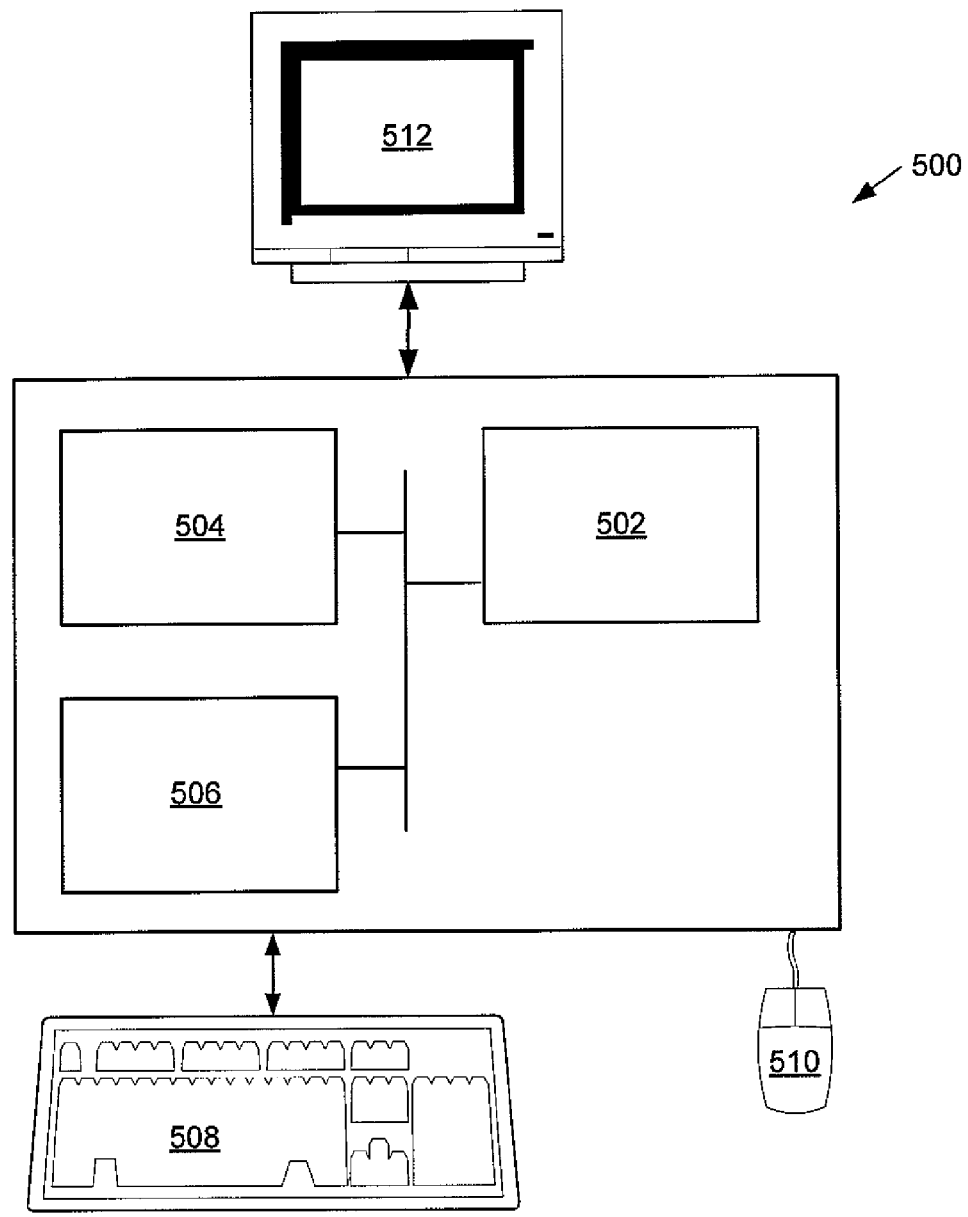
FIG. 18 shows a computer system in accordance with one or more embodiments of the invention.

The invention may be implemented on virtually any type of computer regardless of the platform being used. For example, as shown in FIG. 18, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., procedure engines, isolated entity, virtual world entity, buyer computer system, repositories, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completing an electronic commerce transaction, comprising:
   receiving security information associated with a real identity of a buyer;
   receiving virtual security labels corresponding to security information associated with the real identity of a buyer;
   storing the security information and the virtual security labels in an isolated entity of a dedicated payment system;
   transferring the virtual security labels to a virtual world entity of the dedicated payment system, wherein the virtual world entity is operatively connected to a first network using which the buyer connects to the virtual world entity of the dedicated payment system, and wherein the virtual world entity and the isolated entity are each separate and distinct portions of the dedicated payment system; and executing the electronic commerce transaction via the first network using the virtual security labels and the security information associated with the real identity of the buyer, wherein the isolated entity is communicatively disjoined from the virtual world entity and the first network; and wherein security information associated with the real identity of the buyer is not transmitted via the first network during execution of the electronic commerce transaction.

2. The method of claim 1, wherein the electronic commerce transaction comprises a purchase of an object by the buyer.

3. The method of claim 2, wherein executing the electronic commerce transaction comprises:

executing a first portion of the electronic commerce transaction, wherein the first portion comprises receiving and completing an online order for the object over the first network using the virtual security labels associated with the buyer;

executing a second portion of the electronic commerce transaction using the security information associated with the real identity of the buyer supplied to the isolated entity, wherein the second portion comprises performing a first wire transfer from a buyer bank account to a system operator bank account, wherein a payment amount associated with the first wire transfer corresponds to a price of the purchased object;

executing a third portion of the electronic commerce transaction, wherein the third portion comprises delivering the purchased object associated with the electronic commerce transaction to the buyer; and executing a fourth portion of the electronic commerce transaction using banking information associated with an online vendor from which the object is purchased, wherein the fourth portion comprises performing a second wire transfer from the system operator bank account to the online vendor for the delivered purchased object, wherein the banking information associated with the online vendor is supplied to the isolated entity.

4. The method of claim 3, wherein the second wire transfer to the online vendor for the purchased object is initiated after delivery of the object to the buyer is successful.

5. The method of claim 3, wherein the first wire transfer and the second wire transfer are performed over a proprietary network configured to facilitate communication between the isolated entity and a plurality of banks.

6. The method of claim 3, further comprising:

executing a delivery order to the online vendor to deliver the purchased object after the payment amount associated with the first wire transfer is secured.

7. The method of claim 1, wherein security information associated with the real identity of a buyer comprises at least one selected from a group consisting of a name of the buyer, a delivery address of the buyer, an electronic mail address of the buyer, a telephone number of the buyer, a social security number of the buyer, a license plate associated with the buyer, banking information of the buyer, and a security parameter representing a parameter fulfilled during the electronic commerce transaction.

8. The method of claim 7, wherein banking information of the buyer comprises information used by the dedicated payment system to obtain a payment from a banking account associated with the buyer.

9. The method of claim 1, wherein only the virtual security labels are transmitted over the first network to facilitate the completion of the electronic commerce transaction.

10. The method of claim 1, wherein virtual security labels comprise at least one selected from the group consisting of a login name associated with the buyer, a password associated with the login name, a virtual identification number, a virtual electronic mail address, a virtual delivery address of the buyer, a virtual telephone number of the buyer, a virtual banking label, and a virtual security parameter.

11. The method of claim 10, wherein the virtual security parameter is a label corresponding to personal information unique to the buyer.

12. The method of claim 1, wherein the security information associated with the real identity of the buyer is supplied to the isolated entity via a proprietary network which is distinct from the first network.

13. The method of claim 1, wherein transferring the virtual security labels to the virtual world entity comprises:

storing the virtual security labels in a transporting agent, wherein the transporting agent is configured to transmit a plurality of messages that comprise a plurality of data objects configured to store the virtual security labels, wherein the transporting agent is connected to only one of the virtual world entity and the isolated entity at a time.

14. The method of claim 13, wherein the first network is used to transmit electronic commerce transaction information to the virtual world entity.

15. The method of claim 14, wherein electronic commerce transaction information comprises at least one selected from a group consisting of a transaction reference, a transaction price, a delivery service reference, and a delivery service price.

16. The method of claim 14, further comprising:

transferring the transaction information and the virtual security labels from the virtual world entity to the isolated entity using the transporting agent.

17. The method of claim 13, wherein the transporting agent transmits the plurality of messages by:

generating a first message comprising data associated with the electronic commerce transaction, wherein the first message comprises a first plurality of data objects that represent a first portion of the electronic commerce transaction, transmitting the first message from the isolated entity to the virtual world entity, wherein the virtual world entity comprises a procedure engine configured to execute procedures associated with the first plurality of data objects in the isolated entity to obtain a completed first portion of the electronic commerce transaction.

18. The method of claim 17, wherein the plurality of data objects are one selected from the group consisting of predefined formatted files comprising XML files and data streams.

19. The method of claim 1, wherein the first network is one selected from the group consisting of the Internet, a mobile telephone network, a television-cable network, and a public switched telephone network (PSTN).

* * * * *